United States Patent [19]

Keegan et al.

[11] 3,836,706

[45] Sept. 17, 1974

[54] FLYING SPOT SCANNING SYSTEM

[75] Inventors: Patrick J. Keegan, Van Nuyes; Carl J. Roberts, Northridge, both of Calif.

[73] Assignee: Cassette Sciences Corp., New York, N.Y.

[22] Filed: June 18, 1973

[21] Appl. No.: 370,718

[52] U.S. Cl. .......................... 178/5.2 D, 178/DIG. 28

[51] Int. Cl. .......................................... H04n 5/36

[58] Field of Search ............... 178/5.2 R, 5.2 D, 7.2, 178/DIG. 28

[56] References Cited

UNITED STATES PATENTS 2,622,147 12/1952 Condliffe et al. ............ 178/DIG. 28

*Primary Examiner*—Robert L. Richardson

*Attorney, Agent, or Firm*—Hubbell, Cohen & Stiefel

[57] ABSTRACT

A flying spot scanning system includes a flying spot scanner arrangement utilizing a multi-facetted prism, such as an 18-sided prism, for scanning a movie film and producing color video signals therefrom for display on a conventional color television receiver. Red, blue, and green photomultiplier tubes in conjunction with a dichroic mirror arrangement provide the color signals which are gamma corrected, and phosphor corrected and processed to provide the composite color video signal. The film preferably contains a separate audio track which is separately processed and mixed with the color video signal to provide the composite video signal. The control for the flying spot scanner is provided by a digital synchronizing generator which utilizes the color burst frequency as the basic timing reference signal for generating all of the control signals for the television receiver, the scanner, and the synchronizing signals for ant external devices, such as a computer terminal and a computer, to lock these external devices to the scanning of the flying spot scanner, which digital signals are utilized to directly drive analog circuitry. Specifically, the digital synchronizing generator generates the vertical sweep drive and the horizontal sweep drive signals for the cathode ray tube flying spot scanner, the composite sync, chromo clamp, video clamp, color burst, and composite blanking signals which are provided to the flying spot scanner and subsequently to the television receiver in the composite video signal, and the horizontal sync and vertical sync signals which are utilized for external control of video so as to lock the external device to the television sweep provided from the digital synchronizing generator. The audio portion of the signal is processed through an audio FM modulator utilizing a field effect transistor to modulate an LC oscillator, the field effect transistor being utilized as a phase variance circuit. The gamma correction circuitry utilized in the system is substantially temperature independent. The phosphor correction circuitry and chroma processing circuitry utilize multi function elements to increase efficiency.

21 Claims, 15 Drawing Figures

FLYING SPOT SCANNING SYSTEM

BACKGROUND OF THE INVENTION

1. Field of the Invention

The present invention relates to flying spot scanning systems for scanning a continuously moving film to produce a video picture therefrom.

2. Description of the Prior Art

Prior Art flying spot scanning systems, such as the type disclosed in U.S. Pat. Nos. 3,566,012; 3,539,710 or 2,912,487 are for the most part, dependent on the frame rate for the video scan. Furthermore, the majority of prior art flying spot scanners utilize some type of film gate which introduces a pull down time lag, which is the time required to move the film into the shutter for scanning. In an attempt to overcome these disadvantages, some prior art flying spot scanners have introduced the use of a prism so as to make the video scan independent of the frame rate. Such prior art flying spot scanners are illustrated in U.S. Pat. Nos. 3,005,047 and 2,622,147, by way of example. The scanning arrangement in these prior art scanners, however, such as U.S. Pat. No. 2,622,147 is complex and requires an elaborate gating scheme for properly interlacing the scanning raster. In a further attempt to avoid the problems incident with such a complex mechanism, some prior art flying spot scanners of the prism type, known as continuous-motion film scanners, have been developed for the scanning of continuously moving color film. These rotating prisms, however, are hollow prisms whose exterior surface is a polygon while the interior surface is a circle. Resultant problems of such a configuration is that it is a complex configuration to grind and allows very little margin for error in the grinding of the interior circle. If there is an error in the uniformity of this interior circle, undersirable distortions will be introduced in the resultant scan. Furthermore, in such an arrangement distortions are introduced due to the differences in distance between the face-to-face dimensions of the prism versus the point-to-point or corner-to-corner dimensions on the prism. The greater the difference the greater the distortion. Some prior art attempts to compensate for this distortion have involved the placing of a complex optical arrangement inside the interior of the hollow rotating prism resulting in increased cost and complexity of the resultant scanning system.

These prior art flying spot scanners utilize external synchronizing signal sources for providing the synchronizing signals to control the sweep of the scanner as well as separate synchronizing generators to provide the control signals for the television receiver which may be coupled to the scanner output. Thus, there is no prior art arrangement known to the applicants which provides all of the control signals for synchronizing the operation of the scanner as well as of the receiver in a single synchronizing generator. Furthermore, although digital synchronizing signal generators for providing television synchronizing signals are well known, such as the type disclosed in U.S. Pat. Nos. 3,359,367; 3,487,166 or 2,850,568, these generators utilize basic timing references as the master clock which reference signals are not necessarily synchronized with the color burst frequency. This can result in problems in video transmission if it is attempted to utilize such prior art generators with a flying spot scanner. Furthermore, these prior art digital synchronizing signal generators only generate a portion of the control or synchronizing signals required for the video display and, accordingly, the chroma clamp, a video clamp, and color burst, by way of example, must be separately generated. In such an instance, the digital synchronizing signal generator has a different basic time reference than the color burst signal has due to the separate oscillators apart from, of course, the color burst oscillator. Thus, despite the fact that these prior art video synchronizing generators utilize a basic timing reference signal and a digital divider chain to produce some of the required synchronizing signals for television transmission, these signals are not necessarily in sync with the color burst signal. This problem becomes particularly acute if it is attempted to utilize such an arrangement with external control, such as a computer, in an interactive network, such as the type disclosed in U.S. Pat. No. 3,629,844.

Prior Art flying spot scanners for movie film in which a separate audio track is utilized, which track is separately processed to produce an FM modulated audio signal for ultimate combination with the video signal to produce a composite video signal for transmission to the television receiver, are generally of the type utilizing a crystal oscillator or an LC oscillator at the normal audio sub carrier frequency of 4.5 megahertz. The incomming audio signal picked up by the separate sound head is utilized to modulate the output of this oscillator to produce an FM modulated audio signal. However, prior art modulators of this type introduce undesirable AM modulation in this FM modulated audio output signal.

With respect to the video processing of the signal in prior art flying spot scanning arrangements, such systems are inefficient in that they utilize separate elements to perform each of the functions required. For example, prior art phosphor correction circuits utilize separate transistor elements to provide signal amplification, phosphor correction and to provide a low impedance path for the video clamp. Another such example, is in the chroma video processing circuitry of such a prior art arrangement, separate transistors are utilized to provide low impedance path for the chroma clamp as well as to perform the function of a signal summing amplifier. Similarly, in the chroma modulator of such prior art arrangements, separate transistors are utilized to provide impedance matching as well as to perform the function of a driver for the chroma modulator.

Furthermore, in such prior art flying spot scanning arrangements, the gamma correction circuitry is normally related to the diode breakpoint to accomplish gamma correction. This results in a sensitivity of this circuitry to variation in temperature, which variations can cause the diodes to introduce errors in the gamma correction.

These disadvantages of the prior art are overcome by the present invention.

DETAILED DESCRIPTION OF THE PREFERRED EMBODIMENTS

General Description

Figure 1:
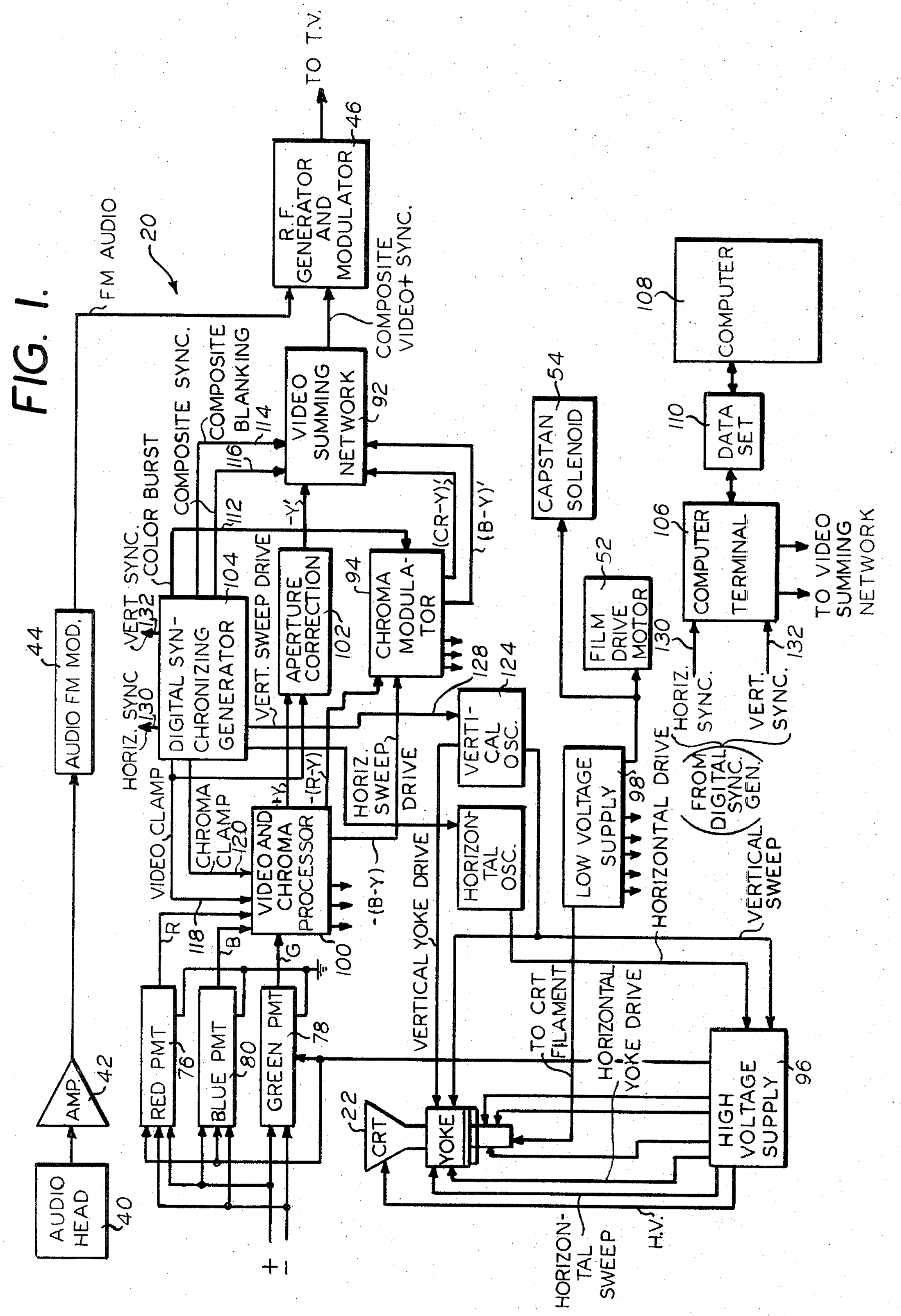
FIG. 1 is a block diagram of the preferred embodiment of the flying spot scanning system of the present invention illustrating the electrical signal paths present therein.
Figure 2:
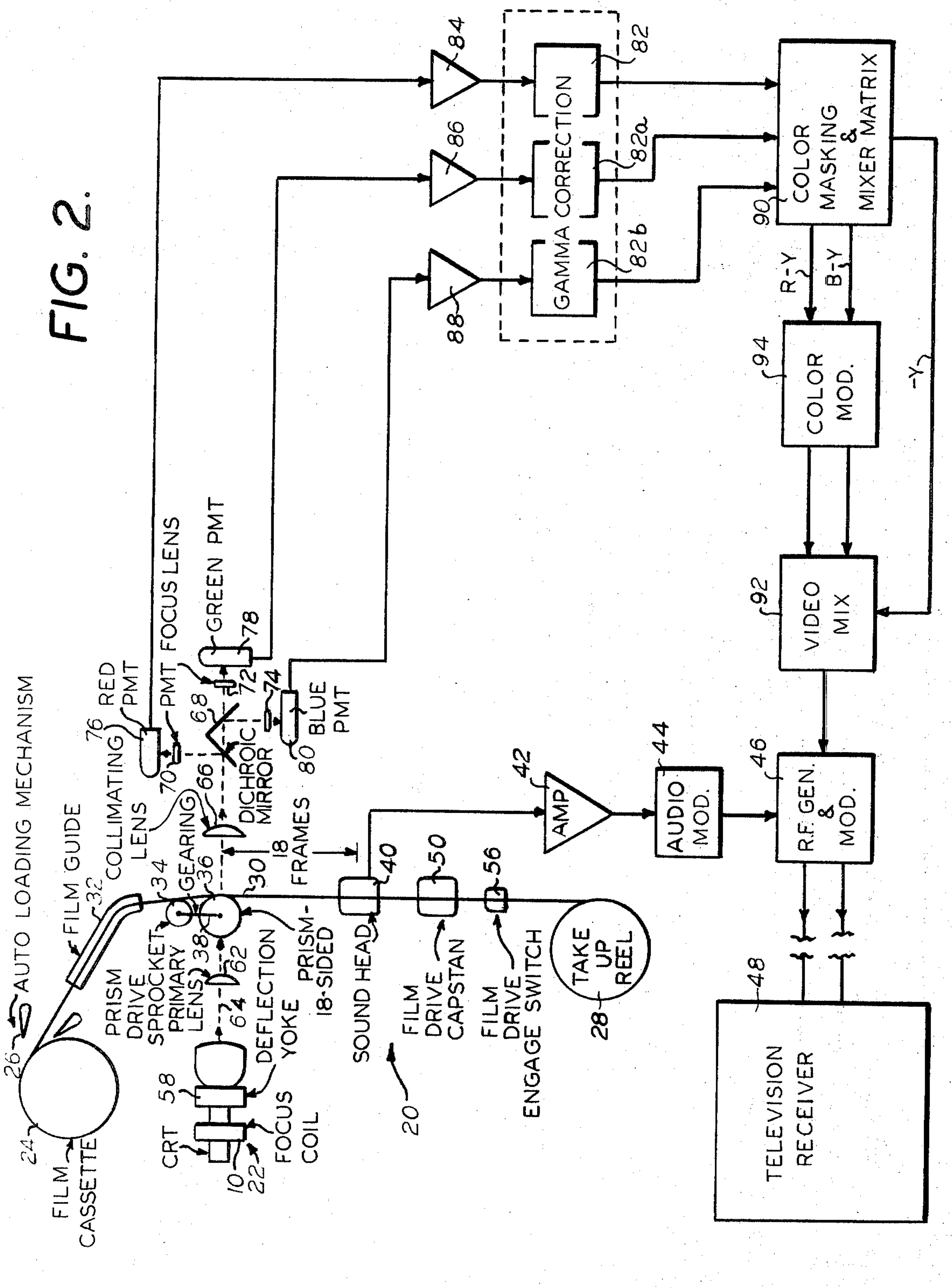
FIG. 2 is a partial block diagram of the flying spot scanning system illustrated in FIG. 1, illustrating the optical arrangement present therein.

Referring now to the drawings in detail, and initially to FIGS. 1 and 2, the preferred embodiment of the flying spot scanning system of the present invention, generally referred to be reference numeral 20 is shown. The flying spot scanning system 20 preferably includes a cathode ray tube flying spot scanner 22, such as any conventional cathode ray tube performing this function, a film supply 24 such as a film cassette or reel, an automatic loading mechanism for threading this film on to the film drive mechanism, such as the type disclosed in U.S. Pat. Nos. 3,429,518; 3,500,879; or 3,536,276 by way of example, generally referred to by reference numeral 26. The scanner arrangement 20 also includes a conventional take-up reel 28 for the film being supplied from supply reel or cassette 24. The film 30 is preferably passed to a conventional film guide 32, past an idler sprocket wheel 34 which is not driven but merely rotates with the film as the film passes by and a multifacetted prism 36, such as an 18-sided prism to be described in greater detail hereinafter, the prism enabling the video scan to be independent of the frame rate due to the bending of the light beam which occurs causing the light beam to track the film frame. The prism 36 is preferably geared directly to the sprocket wheel 34 by conventional gearing 38 so as to rotate with the prism for synchronizing the film 30 feed. Thus, the sprocket 34 is only driven by the film 30 and the prism 36 is only driven by the sprocket 34. The film 30, as illustrated in FIG. 2, is fed past a conventional audio or sound head 40 which picks up the audio track contained on the film and is preferably spaced 18 frames from the location of the optical or video pickup by prism 36, or any other desired spacing may be utilized. The sound head 40 is connected through a conventional amplifier 42 to an audio FM modulator 44, to be described in greater detail hereinafter, which provides an FM audio signal output to a conventional radio frequency generator and modulator 46 from which the composite television signal is transmitted to a conventional television receiver 48 if desired. The film 30 is fed to the takeup reel 28 by means of a conventional film drive capstan arrangement 50, preferably, the capstan 50 being driven by a conventional motor 52 which cooperates with a conventional capstan solenoid 54 (FIG. 1) which is engaged by closure of the film drive engage switch 56 which acts to bring the capstan and pressure roller in engagement with the film 30 to drive the film past the prism 36 and the sound head 40 onto the takeup reel 28.

Referring now to the flying spot scanner 20 preferred optical path, this path includes the conventional cathode ray tube 22 which includes a deflection yoke 58 and a focusing coil 60 in conventional fashion. The flying spot light output of the cathode ray tube 22 is preferably directed through a conventional primary lens 62 onto the adjacent face of the multi-facetted prism 36, which is preferably an 18 facet prism, to be shown in greater detail hereinafter, the particular face being located in whole or part along the optical axis 64 of the scanning system 20. As is well known, three facets of the prism 36 must cover three frames so that one facet fades in, one facet fades out and one facet is being projected. This change of light between successive frame in a continuous motion film scanner is known as lap-dissolve which is the gradual disappearance of one scene over its entire area and its replacement by another scene, a continuous motion compensator operating by making a fast lap-dissolve between each frame and the next one with the amount of light going through the system being the sum of that of the two paths, with this amount of light reaching the photo tubes, to be described in greater detail, any particular point on the film 30 being unaffected by the motion of the film 30. The light output of the prism 36, which is dependent on the index of refraction, the thickness of the prism as well as other factors, is directed along the optical path 64 through a conventional collimating lens 66, which collimated light is passed to a conventional dichroic mirror arrangement 63 which conventionally separates the light into its red, green and blue components. These components are directed along separate paths through conventional fresnel or focusing lenses 70, 72 and 74, respectively, to appropriate conventional photo multiplier tubes 76, 78 and 80, respectively, for red, green, and blue, respectively. The output of these photo multiplier tubes 76, 78 and 80 are individually fed to phosphor correction circuitry (not shown in FIG. 1–2) and gamma correction circuitry 82, to be described in greater detail hereinafter, through conventional amplifiers 84, 86 and 88, respectively and therefrom to video processing circuitry for accomplishing color masking and mixture matrixing 90 and aperture correction to produce the color signal R—Y and B—Y, where Y represents the luminance. The mixture matrixes 90 also produce the minus Y (—Y) signal which is fed to a conventional video summing network or video mixer 92. The RY and B—Y color signals are fed through a color or chroma modulator 94 where they are processed in substantially conventional fashion and then to the video summing network 92 whose output is the composite video plus synchronizing signals which is, in turn, fed to the radio frequency generator modulator 46 for subsequent transmission to the television receiver 48.

Referring once again to FIG. 1, the cathode ray tube flying spot scanner 22 preferably includes a conventional high voltage supply 96 and low voltage supply 98, the majority of the conventional connections thereto being omitted in FIG. 1 for purposes of clarity. The high voltage supply 96, by way of example, is connected to the anode of the cathode ray tube 22, and the low voltage supply 98 is connected to the CRT filament. As illustrated in FIG. 1, the signal output of the photo multiplier tubes 76, 78 and 80 are fed to a video and chroma processor 100, to be described in greater detail hereinafter with reference to FIGS. 10 and 11, which processor 100 includes the chroma clamps, the video clamps, the phosphor correction circuitry and the gamma correction circuitry. The output of the video and chroma processor 100 is connected to the chroma modulator 94 and to a conventional aperture correction network 102 which conventionally compensates for the distortion introduced by the finite size of the aperture of the scanning beam. As was previously mentioned, the output of this aperture correction network 102 which is the signal −Y′, where Y represents the luminance, is fed to the video summing network 92 as is the (R−Y)′ and (B−Y)′ color signal outputs of the chroma modulator 94. As shown in FIG. 1 and as will be described in greater detail hereinafter with reference to FIGS. 7, 8 and 9, the overall operation of the flying spot scanning system 20 is controlled by a digital synchronizing generator 104 which generates all the synchronizing signals for control or synchronization of the flying spot scanner 22, the television receiver 48 and, as will be described in greater detail hereinafter, for synchronization or locking in of any external devices to be utilized with the flying spot scanner such as a conventional computer terminal 106 which interfaces with a conventional computer, such as a general purpose digital computer 108 through a conventional data set 110. The digital synchronizing generator 105 generates the color burst signal which is fed to the chroma modulator 94 via path 112, the composite blanking signal which is fed to the video summing network 92 via path 114, the composite sync signal which is fed to the video summing network 92 via path 116, the video clamp and chroma clamp signals which are fed to the video and chroma processor 100 via paths 118 and 120, respectively, and the horizontal sweep drive signal and vertical sweep drive signal which are fed to a conventional horizontal oscillator 122 and vertical oscillator 124 via paths 126 and 128, respectively, these sweep drive signals synchronizing the horizontal and vertical oscillators, which are normally free running, to our scanning system so as to synchronize the flying spot scanner tube 22, the vertical oscillator 124 providing the vertical yoke drive to the tube 22 as well as the vertical sweep and the horizontal oscillator 122 providing the horizontal yoke drive to the tube 22 as well as the horizontal sweep. As was previously mentioned, the digital synchronizing generator 104 also preferably provides a horizontal sync signal via path 130 and a vertical synchronizing signal via path 132 for external device control so as to lock or synchronize the external device to the sweep of the flying spot scanner 22.

Thus, if desired, if a computer 108 is to be utilized in conjunction with the flying spot scanner system 20, such as to interact therewith in a student response type of system such as where the program or lesson is displayed and at the end thereof the student is asked questions to which he must respond, which questions are graded by the computer 108 and appropriate portions of the lesson replayed in response to incorrect answers by the student, the digital synchronizing generator 104 provides the horizontal and vertical sync signals via paths 130 and 132 to the keyboard or computer terminal 106 to synchronize the computer terminal 106 with the flying spot scanner. The output of this computer terminal or keyboard 106 is preferably fed to the video summing network 92 where it is added into the composite video signal so that the resultant composite signal to be displayed on the television receiver 48 includes the information provided via the keyboard or computer terminal 106. The computer terminal 106 also acts as an interface between the flying spot scanner system 20 and the computer 108 so that when the information is provided from the computer through the computer terminal 106 this information is added in to the composite video signal through the video summing network 92 in the manner described above. Utilizing such a system, optical indicia may be placed on the film 30 to identify key program points on the film 30 to the computer 108, such as for purposes of replay of specific portions.

PRISM CONFIGURATION

Figure 3A:
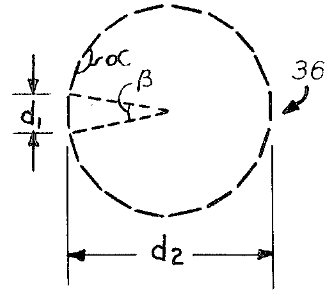
FIGS. 3*a* and 3*b* are diagrammatic illustrations of the preferred prism configuration utilized in the embodiment illustrated in FIG. 2.
Figure 3B:
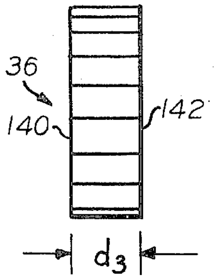

Referring now to FIG. 3 (FIGS. 3*a* and 3*b*), the preferred prism configuration 36 of the present invention is diagrammatically illustrated. Preferably, the prism 36 comprises an optimum balance between the minimization of distortion, light through the prism and size of the back focal length of the primary lens 62. Preferably, the optimum number of facets for the preferred prism 36 of the present invention is 18, although any other desired number of facets may be utilized if this optimum arrangement is not desired with corresponding variation in the various factors previously mentioned. The optimum diameter of the prism 36 for a given number of facets is based on the following formulations:

Equation for diameter of prism for given number of facets:

a. Average diameter $D' = D\text{max} + D\text{min}/2$
where $D$ represents diameter.

b. Corner to corner diameter $= D\text{max}$ $[D\text{max} + Yn\theta(N_d^2 - \sin^2\theta)^{1/2}]/\theta_n \sin\theta[(N_d^2 - \sin^2\theta)^{1/2} - \cos\theta]$ c. Center to Center diameter $= D\text{min}$ $D\text{min} = Yn^n d/[\theta_n\,(N_d - 1)]$ Where $\theta = \theta\text{max}$ $\theta^n$ = angle formed between face and film $Yn$ = half pitch of prism = half frame height $N_d$ = refractive index for sodium D line $V_d$ = Abbey constant $= Nd - 1/NE - Nc$, $f$ line = blue, $c$ line = red For purposes of the above, it is assumed that the film 30 is super 8 milimeter movie film although this formulation is true for any millimeter movie film, resulting in a corresponding change in the parameters. Preferably, the prism 36 is glass of the type known as Schott BK 7, which is the U.S. Glass Industry standard identification for this glass formulation, having a refractive index for the sodium D line of 1.517 with a corresponding Abbey constant of 64.2. Preferably, the prism 36 has an angle tolerance of plus or minus half a minuite and a dimension tolerance of plus or minus one mil. The optical faces of the prism 36 are preferably polished flat to within one quarter $\gamma$ and the sides 140 and 142 of the prism 36 are preferably fine grind or frosted and blackened so as to be parallel to each other within plus or minus half a minuite and perpendicular to all optical faces within plus or minus half a minuite. Furthermore, the interior angle $\alpha$ between adjacent optical faces of the prism 36 is preferably 160° plus or minus half a minuite. By way of example, the preferred dimensions of the prism 36 are shown as $d$, where $d$, represents the length of one of the faces, $d_2$ represents the diameter of the prism and $d_3$ represents the width of the prism. D, is preferably 0.246 inches, $d_2$ is approximately 1.396 inches and $d_3$ is approximately 0.5 inches, with $\beta$ being approximately 20°.

As was previously mentioned, the rotating prism 36 of the flying spot scanner 20 is a continuous motion scanner wherein the light from the flying spot source 22 is refracted by the prism 36 so that the amount of light reaching the photo tube 76, 78 and 80 on a particular point on the film 30 is unaffected by the motion of the film and the beam of light tracks the film frame during the rotation of the prism 36, on face fading in the picture, one face fading out the picture and one face projecting the picture being scanned. It should be noted that the thickness of the prism is determined by the system optics due to the location of the prism between the primary lens 62 and the film 30. Therefore, the diameter of the prism 36 determines the back focal length of the primary lens 62, which is the focal length between the film and the primary lens. As the back focal length increases with increase in prism diameter, the cathode ray tube 22 must be moved and the optical path is therefor lengthened. It should also be noted that the greater the number of faces of facets for the prism 36, the less the light passing through the prism and the greater the distance face-to-face or center-to-center versus corner-to-corner on the prism, the greater the distortion present in the prism. Accordingly, as was previously mentioned, the preferred arrangement which balances all these factors to provide an optimum configuration with respect to quality and cost comprises 18 facets.

DIGITAL SYNCHRONIZING GENERATOR

Figure 6:
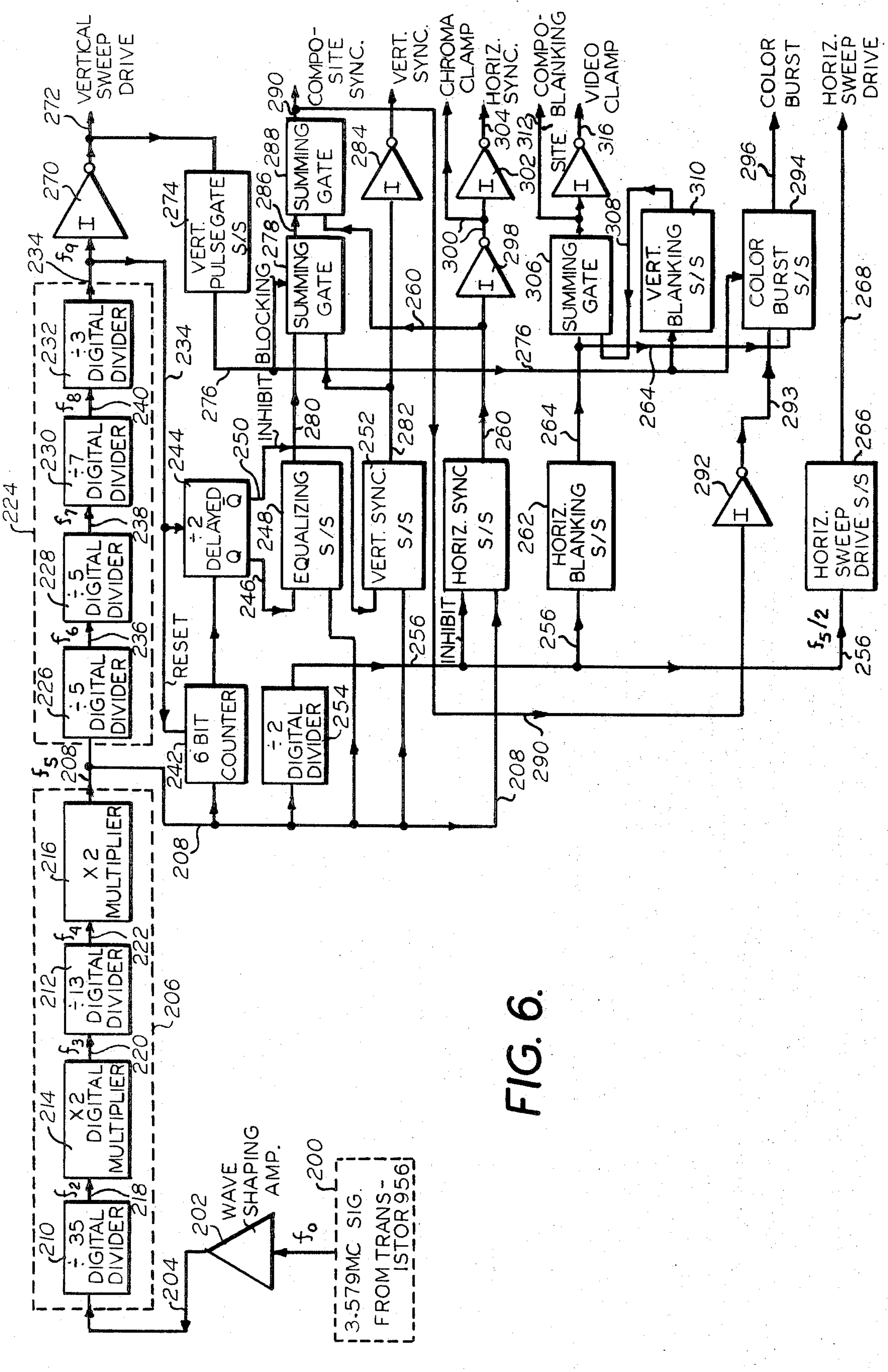
FIG. 6 is a logic block diagram of the preferred clock train of the preferred digital synchronizing generator illustrated in block in the embodiment of FIG. 1.
Figure 7:
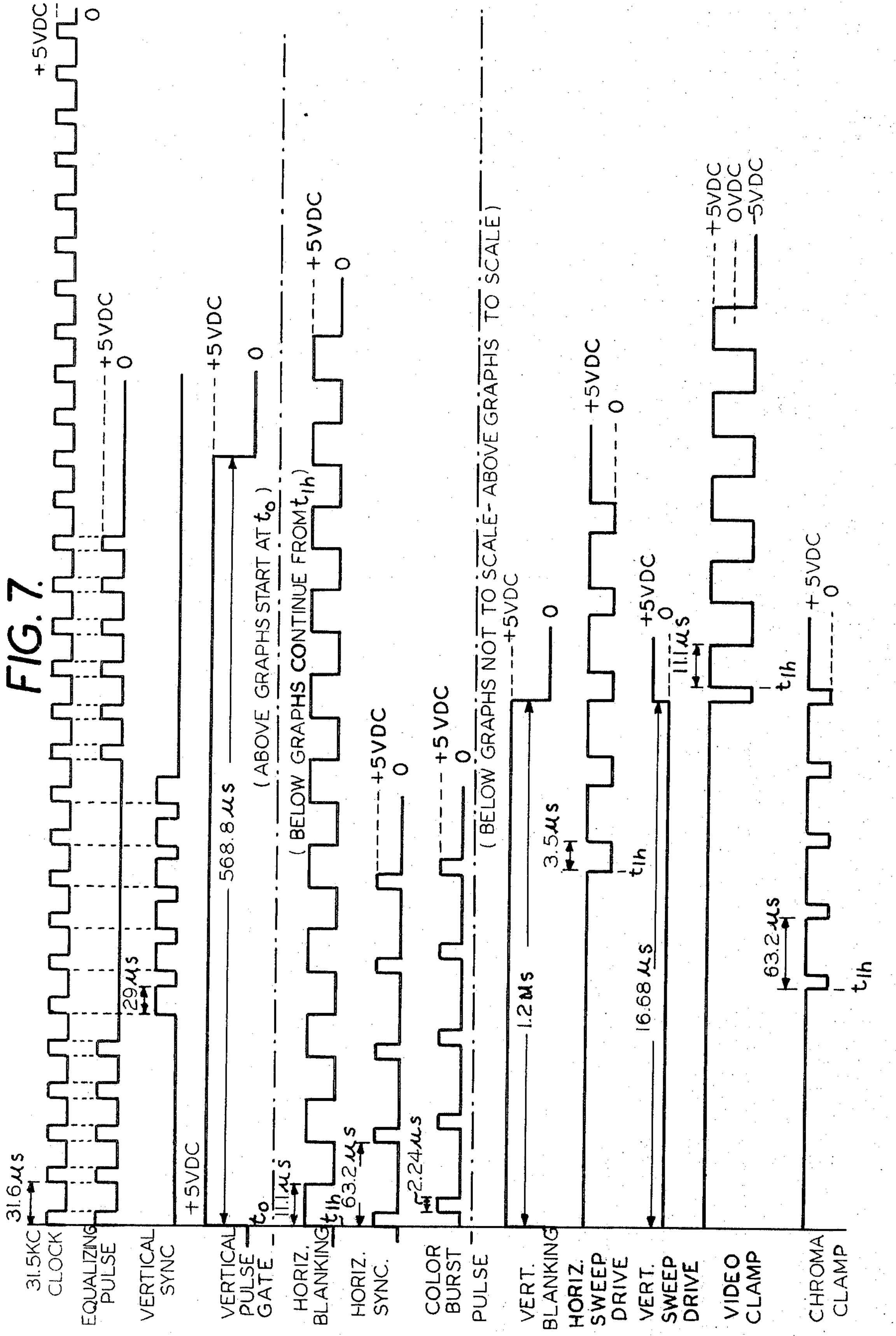
FIG. 7 is a graphical illustration timing diagram of the various signals present in the clock train of FIG. 6.
Figure 8A:
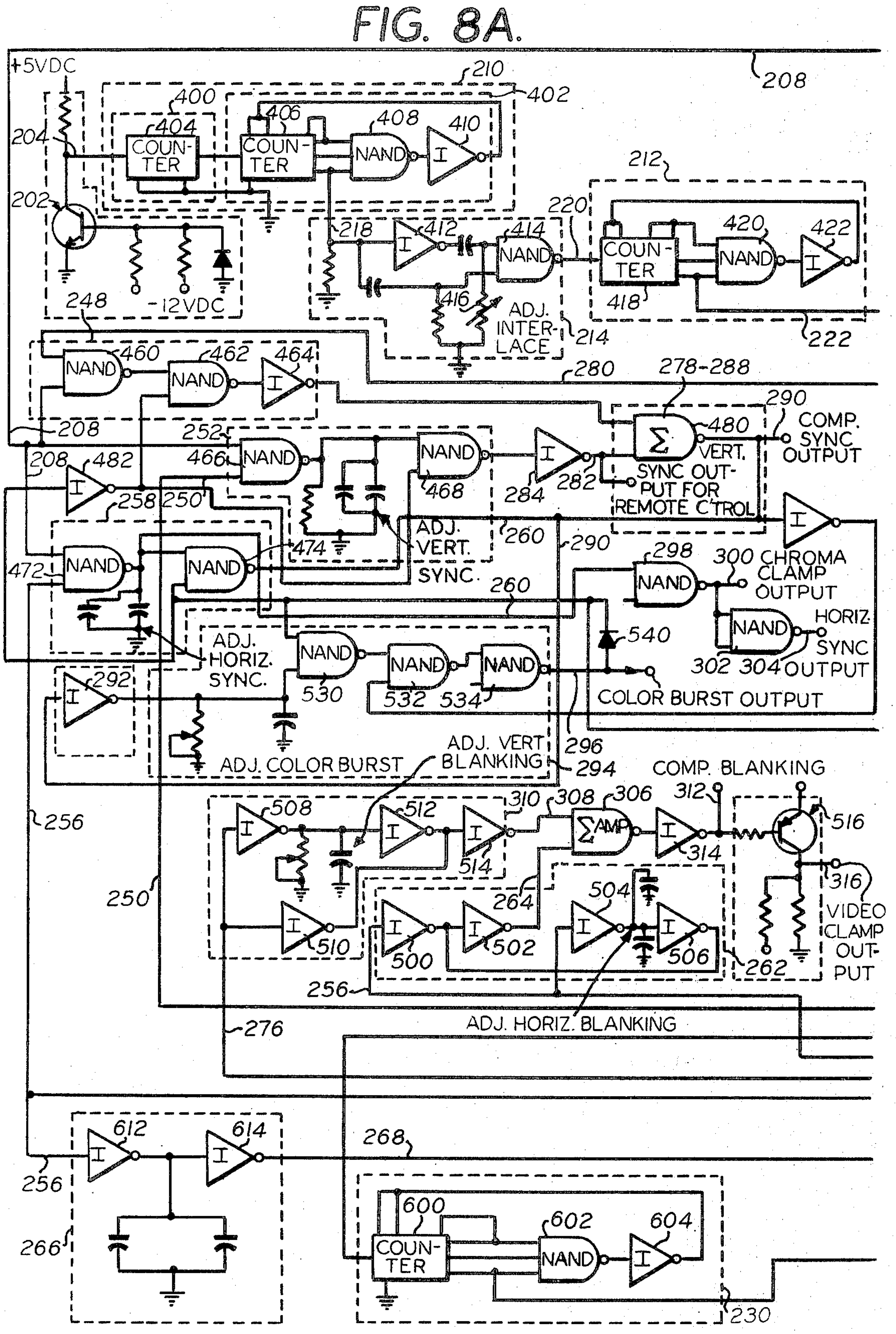
FIGS. 8*a* and 8*b* are detailed schematic diagrams, partially in block, of the clock train illustrated in FIG. 6.
Figure 8B:
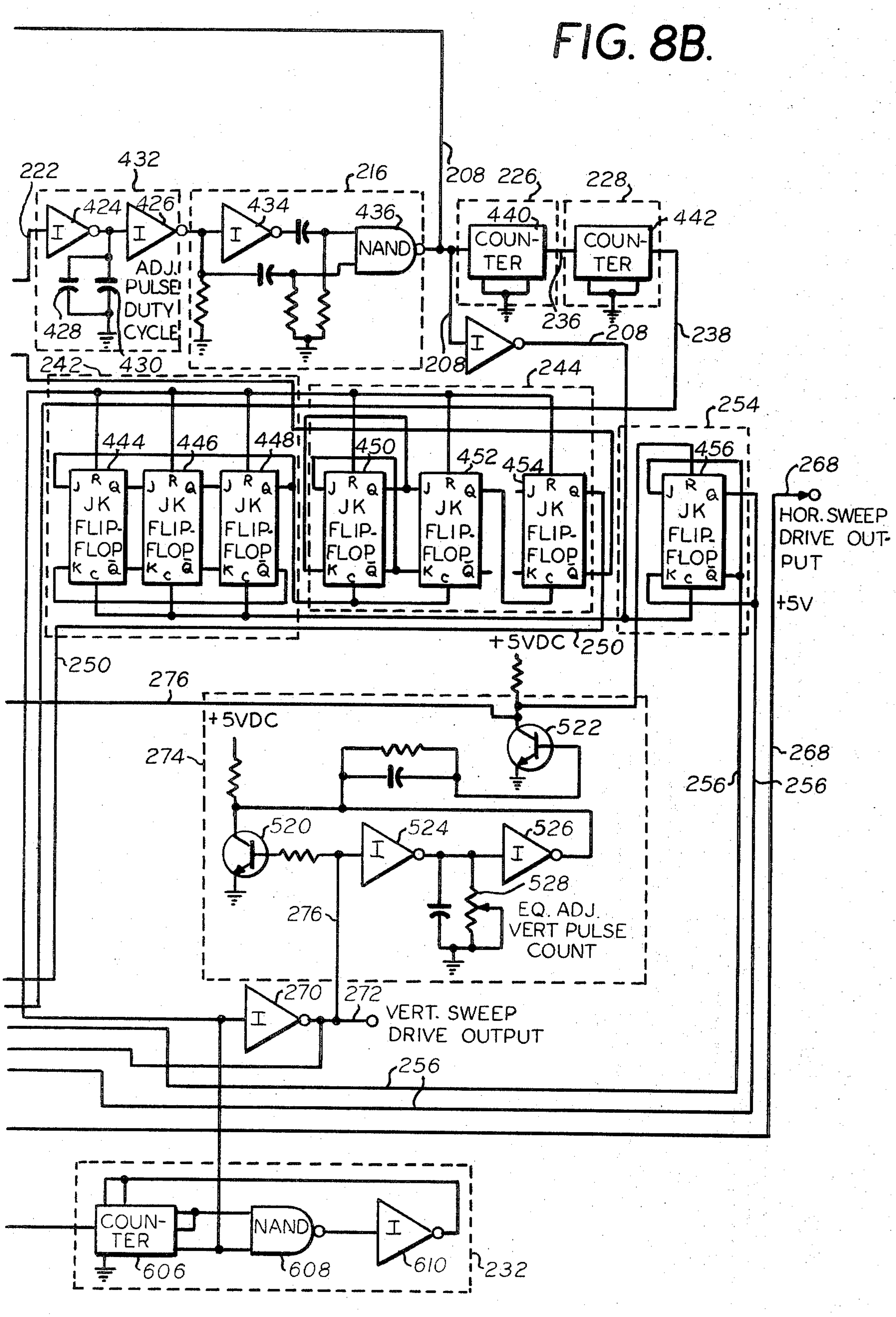

Referring now to FIGS. 6, 7 and 8, the preferred digital synchronizing generator 104 of the present invention shall be described in greater detail. Referring initially to FIG. 6, the basic timing reference, which is preferably the color burst frequency of 3.579 megahertz, and is a sine wave, is produced in a conventional oscillator 200 and is fed to a conventional wave shaping amplifier 202 which converts the sine wave to a digital signal at the color burst frequency. This shaped signal is fed via path 204 to a digital divider chain 206 which preferably operates on the shaped color burst frequency signal to preferably produce a digital signal at path 208 in the circuit which is at approximately 31.47 kilohertz. If desired, a single digital frequency divider could be utilized to operate on the incomming shaped signal to produce this 31.47 kilohertz. However, for purposes of illustration, this frequency divider 206 is shown as comprising a pair of digital frequency dividers 210 and 212 with a pair of conventional digital frequency multipliers 214 and 216, with digital frequency divider 210 preferably being a divide-by-35 which receives the 3.579 megahertz shaped signal to provide an output signal via path 218 of approximately 102.3 kilohertz, which signal is input to a digital frequency doubler 214 which produces an output signal on path 220 of approximately 204.6 kilohertz, which signal is in turn fed to a divide-by-13 digital frequency divider 212, which provides an output signal on path 222 which is approximately 15.73 kilohertz, which signal is fed to another digital frequency doubler 216 to provide the resultant output signal of 31.47 kilohertz on path 208. This 31.47 kilohertz clock signal is fed via path 208 to another digital frequency divider chain 224 which also may be a single digital frequency divider although, for purposes of illustration, is shown as comprising four such dividers 226, 228, 230 and 232. The output of the digital frequency divider 224 is preferably a digital signal having a frequency of 59.94 hertz provided on path 234. As shown in FIG. 6, the digital frequency divider 224 comprises a divide-by-5 divider 226 coupled in series with another divide-by-5 digital frequency divider 228, which is turn coupled in series with a divide-by-7 digital frequency divider 230, which is in turn coupled in series with a divide-by-three digital frequency divider 232. Accordingly, the output signal on path 236 from divider 226 is approximately 6.29 kilohertz, the frequency of the output signal provided via path 238 from divider 228 is approximately 1.259 kilohertz, the frequency of the output signal provided via path 240 from divider 230 is approximately 179.8 hertz and the frequency of the output signal on path 234 from divider 232 is, as was previously mentioned, preferably approximately 59.94 hertz.

Referring once again to divider chain 206, the output thereof is preferably connected in parallel to a conventional six bit counter 242 which, as will be mentioned in greater detail hereinafter, preferably resets after each six count so as to let out 6 equalizing pulses, then 6 vertical sync pulses and then 6 equalizing pulses. The reset terminal of this counter 242 is preferably connected via path 234 in parallel with the output of divider chain 224 so as to reset at the beginning of display time. The output of counter 242 is preferably connected to a conventional divide-by-2 delayed JK flipflop 244 which provides steering control for the circuit so as to enable 6 equalizing pulses, then 6 vertical sync pulses, than 6 equalizing pulses to occur before stopping the generation of the pulses by generating an inhibit pulse via path 246 to a conventional equalizing pulse single shot source 248 from the Q terminal, by way of example, and an inhibit pulse via path 250 to a conventional vertical synchronizing pulse single shot 252 from the Q terminal. The trigger for the equalizing pulse single shot 248 is provided in parallel via path 208 as is the trigger for the vertical sync single shot 252, the trigger being the 31.47 kilohertz output of divider chain 206. Similarly, the output of divider chain 206 via path 208 is also connected in parallel through a conventional divide-by-2 digital frequency divider 254, whose output via path 256 is a signal having a frequency of approximately 15.73 kilohertz, to another conventional single shot 258 which produces the horizontal synchronizing signal via path 260, the output of divider 254 being connected in parallel to single shot 258 to provide an inhibit pulse thereto, the trigger pulse for the horizontal synchronizing single shot 258 being provided in a parallel via path 208 at twice the inhibit pulse frequency so that the trigger is inhibited every other pulse in order to generate an interlacing pattern. The output of divider 254 is also connected in parallel via path 256 as a trigger pulse to a conventional horizontal blanking signal single shot 262 whose output via path 264 is the horizontal blanking signal. In addition, the output of divider 254 provided via path 256 is connected in parallel to another conventional single shot 266 which produces the horizontal sweep drive signal via path 268, the signal present on path 256 acting as a trigger pulse for the generation of the horizontal sweep drive.

Referring once again to the output of divider chain 224, this signal has *ch* is a frequency of preferably approximately 59.94 hertz, is connected in parallel via path 234 to a conventional logic inverter 270 to provide the vertical sweep drive signal via path 272. This output signal via path 272 is connected in parallel, preferably, to another conventional single shot 274 which preferably provides a vertical pulse gate signal via path 276. This signal is provided in parallel to a first set of summing gates 278 as a blocking signal thereto so as to block out the vertical sync and equalizing pulses during the non-vertical blanking time; in other words when vertical blanking signals are not transmitted. The input to the summing gate 278 is connected via path 280 and 282, respectively, to the output of the equalizing pulse single shot 248 and the vertical sync single shot 252. The output of the vertical sync single shot 252 provided via path 282 is also preferably connected in parallel to a conventional inverter 284 to provide the vertical sync signal which is utilized for remote control or external control of video so as to enable the output of the data terminal comprising a computer and a keyboard to be synced to the television display, as was previously mentioned. Of course, if notsuch external control is desired, this connection may be omitted. The output of the summing age 278, which is the sum of the equalizing pulse signal and the vertical sync signal, is fed via path 286 to one input of another summing gate network 288. The other input of the summing gate network 288 is connected in parallel via path 260 to the output of the horizontal sync single shot 258 and is the horizontal sync signal. The output of the summing gate 288 which is provided via path 290 is, therefore, the composite sync signal containing the sum of the equalizing pulse, the vertical sync pulse and the horizontal sync pulse signals. This output signal is provided in parallel via path 290 to a conventional inverter 292 and is summed with the output of the horizontal blanking single shot 262 provided in parallel at the input of a conventional single shot 294 which generates the color burst via path 296. The sum of the signals provided via path 293 and 264, respectively, sets the timing reference for the color burst or the duration of the color burst. The color burst single shot 294 is also connected in parallel via path 276 to the vertical pulse gate 274 output so as to inhibit the generation of the color burst during the vertical sync time.

The output of the horizontal sync single shot 258 via path 260 is also connected in parallel to a first inverter 298 whose output is connected in parallel via path 300 to a second conventional logic inverter 302 and to the video processor to provide the chroma clamp signal. The output of the inverter 302 is the inverted horizontal sync signal which is inverted with respect to the composite sync signal and is provided via path 304 for remote control or external control of video so as to enable the output of a data terminal to be synced to the TV display as was previously mentioned. If desired, inverter 302 may be omitted if no external control is desired.

The horizontal blanking signal output via path 264 of single shot 262 is preferably connected in parallel to one input of another conventional logic summing gate 306 whose other input is connected via path 308 to the output of a conventional blanking signal single shot 310. This single shot 310 is preferably connected in parallel via path 276 to the output of the vertical pulse gate single shot 274 so as to be triggered thereby. The output of summing gate 306 preferably comprises a sum of the vertical blanking signal output of single shot 310 and the horizontal blanking signal output of single shot 262 and is provided in parallel via path 312 to the video summing network to provide the composite blanking signal thereto and also to a conventional inverter 314 whose output via path 316 is the video clamp signal which is the inverted sum of the horizontal blanking and vertical blanking signals.

As can be seen by reference to FIG. 1, the video clamp signal output and the chroma clamp signal output are provided to the video and chroma processor 100, the video clamp also being provided to the aperture correction circuitry 102, the composite blanking signal output and the composite sync signal output are provided to the video summing network 92, the color burst signal output is provided to the chroma modulator 94, the horizontal sweep drive and vertcial sweep drive signals are provided to the horizontal oscillator 122 and vertical oscillator 124, respectively, so as to sync the horizontal and vertical oscillators which in turn provide the horizontal yoke drive and horizontal sweep and vertical yoke drive and vertical sweep for the cathode ray tube 22, and the horizontal sync and vertical sync signals, if desired, are provided to the computer terminal 106.

Referring now to FIG. 8, a schematic diagram of the clock train previously described with reference to FIG. 6 is shown. Before describing this circuitry, it should be noted that for purposes of illustration and simplification, conventional decade counters are utilized for all of the counters utilized for all the digital frequency dividers of the clock train with appropriate modifications being made to convert the decade counter into a divide-by-*n* counter where *n* is some other number than 10. If desired, these circuit arrangements could be replaced by a divide-by-*n* counter directly and the circuitry associated with the modification of the decade counter omitted. For example, divider 210 is shown as comprising a divide-by-5 counter 400 and a divide-by-7 counter 402. The divide-by-5 counter 400 comprises a decade counter 404 with appropriate circuit connections and is connected in series to divide-by-7 configuration 402. This configuration comprises a decade counter 406 which is conventionally connected with a NAND gate 408 and a logic inverter 410 in a feedback loop through appropriate connections so as to function as a divide-by-7 counter. If desired, this entire arrangement could be replaced by a divide-by-35 counter. The wave shaper 202 is shown as preferably comprising an NPN transistor in a conventional wave shaping configuration which will not be described in greater detail hereinafter. The frequency doubler 214 preferably comprises a conventional configuration including an inverter 412 and a NAND gate 414 interconnected in conventional fashion with an RC network. As shown and preferred, this network 214 preferably includes a potentiometer 416 for adjusting the interlace. The divide-by-13 digital frequency divider 212 also preferably comprises a conventional divide-by-16 counter 418 connected in conventional fashion through a NAND gate 420 and a logic inverter 422 in a feedback loop to provide a divide-by-13 count instead of a divide-by-16 count, the output of NAND gate 414 being connected to the input of counter 418. The output of the divide-by-13 counter 212 is preferably passed through a conventional circuit comprising a pair of inverters 424 and 426 and a parallel connected pair of capacitors 428 and 430 which are connected in conventional fashion in a circuit for adjusting the pulse duty cycle. The output of this pulse duty cycle adjusting circuit 432 is connected to the input of frequency doubler 216 which is similar configuration to frequency doubler 214 with only the parameters differing, the circuit comprising a logic inverter 434, a NAND gate 436 and an RC network. The output of doubler 216 provided via path 208 is fed to divide-by-5 divider 226 whose output is in turn fed to another divide-by-5 divider 228, which are both conventional decade counters 440 and 442, respectively which are connected in conventional fashion so as to provide a divide-by-5 count instead of a divide-by-10 count. As was previously mentioned, the output of the divider 216 provided via path 208 is also connected in parallel to the vertical sync single shot 252, the equalizing pulse single shot 248, digital frequency divider 254, counter 242, and horizontal sync single shot 258.

As shown and preferred in FIG. 8, the 6 bit counter 242 preferably comprises 3 JK flip-flops 444, 446 and 448 coupled in conventional fashion to provide a 6 count output to the divide-by-2 delayed steering control 224 which, as previously mentioned, comprises a conventional configuration of JK flip-flops 450, 452 and 454, the output being provided via paths 236 and 250 from the Q and $\overline{Q}$ terminals of output stage 454 to the equalizing pulse single shot 248 and the vertical sync signal single shot 252, respectively. The divide-by-2 frequency divider 254 also preferably comprises a conventional JK flip-flop 456 whose output via path 256 is provided to the horizontal sync single shot 258, the horizontal blanking single shot 262 and the horizontal sweep drive single shot 266.

As shown and preferred, the equalizing pulse single shot 248 preferably comprises a conventional configuration of NAND gates 460 and 462 whose output is coupled through a logic inverter 464 via path 280 to a conventional logic summing gate arrangement 278–288 to provide the composite sync output via path 290. Similarly, the vertical sync single shot comprises a conventional logic configuration of NAND gates 466 and 468 together with an RC network having an adjustable vertical sync level, preferably, and whose output is provided to the summing network 278–288 through logic inverter 284. Similarly, the horizontal sync single shot 258 comprises a conventional logic configuration of NAND gates 472 and 474 together with a capacitive network having an adjustable horizontal sync level, preferably, for providing the horizontal sync output via path 260 to the summing network 278–288 and through logic inverter 298 to provide the chroma clamp output via path 300 and in parallel through logic inverter 302 to provide the horizontal sync output of path 304 for remote control. It should be noted that for purposes of illustration, in some instances NAND gates are connected in a conventional logic inverter configuration as opposed to a NAND gate configuration. The difference in utilization is indicated by the legend NAND appearing in the logic symbol when it is utilized as a NAND gate or the legend I appearing in the logic symbol when it is utilized as a logic inverter. It should also be noted that the summing gate network 278–288 for purposes of illustration comprises NAND gate 480 as well as the summing of the horizontal sync 258 output via inverter 482 to NAND gates 462 and 468 of single shots 248 and 252, respectively, so as to logically sum the outputs of the single shots 258, 248 and 252 to provide the composite sync output via path 290. The vertical sync output for remote control is provided via inverter 284.

The horizontal blanking single shot also preferably comprises a conventional logic configuration of logic inverters 500, 502, 504, and 506, together with a capacitor network preferably having an adjustable horizontal blanking level. The output of this horizontal blanking single shot 262 is provided via path 264 to a conventional logic summing gate or summing amplifier 306. Similarly, the vertical blanking single shot 310 also preferably comprises a conventional logic configuration of logic inverters 508, 510, 512 and 514 and an RC network having an adjustable vertical blanking level, the output of the single shot 310 being provided via path 308 to the summing network 306. The output of summing network 306 is provided to inverter 314 in parallel to provide the composite blanking signal via path 312 and through a conventional level shifting network 516 to provide the video clamp signal via path 316.

As was previously mentioned with reference to FIG. 8, the trigger for the vertical blanking single shot 310 is provided via path 276 from the vertical pulse gate single shot 274. As shown and preferred, the vertical pulse gatesingle shot 274 preferably comprises a conventional arrangement of transistors 520 and 522, with the collector of transistor 520 coupled to the base of transistor 522 through a parallel RC network and with the base of transistor 520 tied to the collector thereof to a pair of logic inverters 524 and 526 and an RC network preferably having an adjustable equalizing the vertical pulse count via a potentiometer 528. The vertical pulse gate single shot 274 provides an inhibit pulse to the color burst single shot 294, as was previously mentioned, to set the timing reference for the color burst in conventional fashion, as shown and preferred, this signal being provided from the collector of transistor 522. As was also previously mentioned, vertical pulse gate single shot 274 also provides the trigger pulse for the vertical blanking single shot 310.

The color burst single shot 294, as shown and preferred, comprises a conventional logic configuration including a NAND gate 530, a pair of logic inverters 532 and 534 and an RC network having, preferably, an adjustable color burst level via potentiometer 536. As was previously mentioned, the output of the color burst single shot 294 is inhibited in conventional fashion through the operation of diode 540 in conventional fashion.

Referring once again to divider chain 224, the configuration of divide-by-5 dividers 226 and 228 having previously been described, the divide-by-7 divider 230 and the divide-by-3 divider 232 of the divider chain 224 also preferably comprise a conventional configuration of a decade counter, NAND gate and logic inverter coupled in a feedback loop to modify the decade counter in conventional fashion to provide a divide-by-7 count for divider 230 and a divide-by-3 count for divider 232, divider 230 comprising decade counter 600, NAND gate 602 and logic inverter 604, and divider 232 comprising decade counter 606, NAND gate 608 and logic inverter 610. As previously noted, these configurations could each be replaced by a specific divide-by*n* counter in place of the configurations illustrated for purposes of explanation.

It should also be noted that the horizontal sweep drive single shot 266, which is triggered by the divide-by-2 divider 254 output via path 256, also preferably comprises a conventional logic configuration of a pair of inverters 612 and 614 and a capacitor network having an adjustable horizontal sweep drive start time. It should also be noted that preferably, if desired, the horizontal sweep drive output could be taken directly off the Q output of the JK flip-flop 456 and single shot 266 be omitted.

Referring now to FIG. 7, a timing diagram of the various signals present in the clock logic of the digital synchronizing generator 104 previously described with reference to FIG. 6 and 8 is shown. It should be noted that the signals labeled 31.5 kc clock, equalizing, vertical sync, vertical pulse gate, horizontal blanking, horizontal sync, and color burst pulse are drawn in scale while, for purposes of illustration and simplicity, the signals labeled vertical blanking, horizontal sweep drive, vertical sweep drive, video clamp and chroma clamo are not drawn to scale. However, each of the timing diagrams or graphs is labeled with common points of reference as well as with typical values for ease in understanding the relative timing between the signals. The 31.5 kc clock signal illustrated in FIGS. 7 represents the signal present on path 208 at the output of divider chain 206. By way of illustration and not by way of limitation this signal is shown as having a maximum value of + 5 volts dc and a period of 31.6 microseconds. The equalizing pulse, which is present on path 280, is shown as comprising 6 clock pulses, and a blanked period of 6 more clock pulses, then a subsequent period of 6 more clock pulses which signal is generated due to the operation of flipflop network 244. The vertical sync pulse on the other hand is illustrated as having a blanking period of 6 clock pulses when the equalizing pulse is being generated, then a duration of 6 pulses whose width is illustrated by way of example as 29 microseconds as opposed to the pulse width of the equalizing pulses and clock pulse, and then a blanking period of 6 clock pulses while the equalizing pulse is again generated, this operation being controlled by the flipflops steering control network 244. The vertical pulse gate output signal provided via path 276 is illustratively shown as a single having a pulse width of 568.8 microseconds by way of example. It should be noted that all of the vertical signals described above start at the beginning of a vertical frame whereas all the horizontal signals start at each horizontal line. The horizontal blanking signal, which is illustratively shown as beginning at time *d*, which is one clock period after the end of the vertical pulse gate signal, is a signal having a pulse width of preferably 11.1 microseconds, by way of example as compared to the pulse rate of the other signals. The horizontal sync signal which starts at the same time as the horizontal blanking signal, has a pulse rate equivalent to the block signal pulse rate provided via path 208 and illustratively preferably has a period of 63.2 microseconds. The color burst pulse preferably has the same period as the horizontal sync pulse but is out of phase by one pulse width so that the color burst pulse starts at the end of the horizontal sync pulse and illustratively preferably has a pulse width of 2.24 microseconds. All of the above described signals illustratively preferably have the same dc level of +5 volts. The vertical blanking signal starts at point to as does the vertical pulse gate, and illustratively preferably has a pulse width of 1.2 milliseconds. The horizontal sweep drive is locked with the horizontal blanking signal and is inverted and preferably has a pulse width of 3.5 microseconds illustratively. The vertical sweep drive, which is also inverted and begins at time $t_0$ as does the vertical pulse gate, preferably has a pulse width of 16.68 milliseconds. The video clamp configuration of 1.2 milliseconds during the vertical blanking interval and begins at the start of the horizontal blanking pulse having a pulse width of 11.1 microseconds, illustratively, which is the same pulse width as the horizontal blanking pulse from which the video clamp is generated together with the vertical blanking signal. Thus, the video clamp present on path 316 is the sum of the horizontal blanking and the vertical blanking signals, the 1.2 millisecond portion of the signal representing the vertical blanking contribution to the video clamp signal and the signal having a pulse width of 11.1 microseconds representing the horizontal blanking contribution to the video clamp signal. The chroma clamp is locked to the horizontal sync from which it is generated and is inverted and begins at time $t_{th}$ illustratively preferably having a period of 63.2 microseconds which is the illustrated period of the horizontal sync signal. Once again, all of the above described signals illustratively preferably have a dc level of +5 volts dc.

Summarizing the operation of the flying spot scanner arrangement 20 with respect to the signals generated by the digital synchronizing generator 104, the vertical sweep and horizontal sweep signals are provided to the cathode ray tube flying spot through conventional circuitry to start the vertical sweep and the horizontal scan line by synchronizing the horizontal and vertical oscillators 122 and 124, respectively, to the flying spot scanning system, these oscillators 122 and 124 normally being free running otherwise. The composite sync and composite blanking signals which are generated are required by the television receiver and are not required internally by the flying spot scanner. These signals are fed to the video summing network 92 where they are summed with the video signal and color burst signal to form the composite video signal. The video clamp signal is a plus or minus level signal which is provided to the video processing network 100 and the aperture correction network 102 to provide a reference level when no incoming video data is present. The chroma clamp, which functions in essentially the same way, is a logic level signal and is provided to the video processing network 100 to set a reference level when no incoming video data is present. These signals are only present during the horizontal blanking and vertical retrace times of the cathode ray tube 22 to set up the video reference levels. In other words, anything other than these two signal levels is treated as video data. Therefore, the internal blanking of the video signal is provided by the chroma clamp and the video clamp signals whereas the actual blanking of the CRT 22 is set by the vertical and horizontal sweep drive signals. The color burst signal is provided to the chroma modulator 94 to provide a logic pulse of proper length to generate the color burst reference signal for the color TV receiver. It should also be noted that the vertical sweep signal is utilized to generate high voltage for the CRT 22 in conventional fashion. As was previously mentioned, the horizontal sync and vertical sync signal outputs are utilized for remote control of the system.

AUDIO FM MODULATOR

Figure 9:
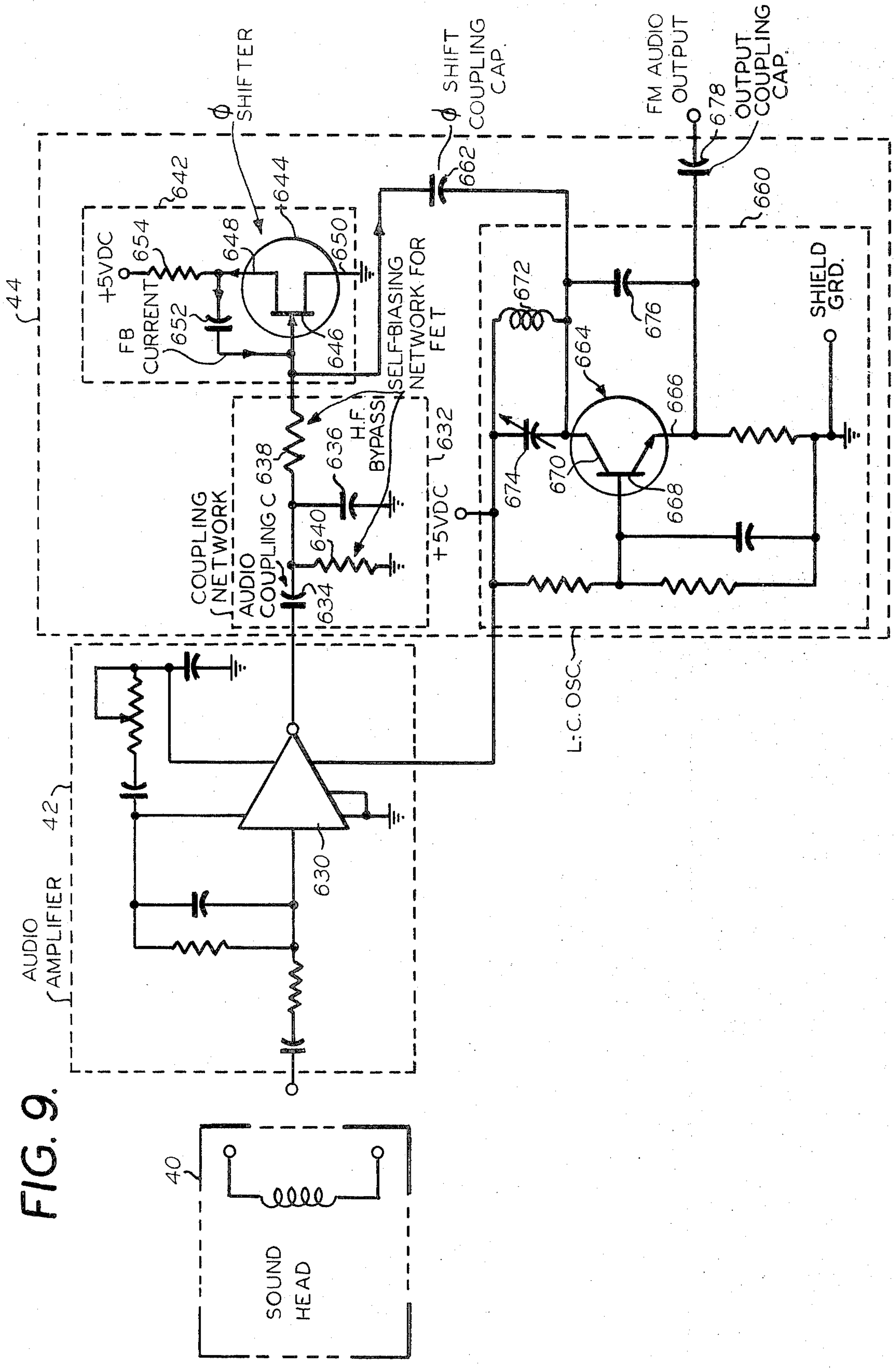
FIG. 9 is a schematic diagram of the preferred audio FM modulator portion of the embodiment illustrated in FIG. 1.

Referring now to FIG. 9, a schematic diagram of the preferred audio FM modulator 44 of the present invention is shown. As was previously mentioned, the sound or audio is picked up from the sound track of the film 30 preferably by means of a conventional sound head 40 which provides this information through a conventional audio amplifier 42 to the audio FM modulator 44. As shown and preferred, the audio amplifier 42 is a conventional integratted circuit audio amplifier comprising an operational amplifier 630 and associated resistor and capacative elements in a conventional network which will not be described in greater detail hereinafter. The output of the audio amplifier 42 is provided to a coupling network 632. The coupling network 632 preferably comprises an audio coupling capacitor 634 connected to the output of the amplifier 630, a high frequency by-pass capacitor 636 connected in parallel therewith, and a parallel pair of resistors 638 and 640 whose function will be described in greater detail hereinafter. The output of resistor 638 is connected to a phase shifter network 642 comprising a field effect transistor 644 having a gate 646, a drain 648, and a source 650, with the source 650 being grounded. The phase shifter network 642 also preferably comprises a feedback path between the drain 648 and the gate 646 through a capacitor 652. Resistor 654 is coupled to the drain in conventional fashion. The resistor 638 in coupling network 632 is connected to the gate 646 of field effect transistor 644 and resistors 638 and 640 act as a self-biasing network for the field effect transistor 644. The gate of the field effect transistor 644 in phase shifter network 642 is coupled to a conventional LC oscillator configuration 660, such as a conventional grounded base configuration illustrated in FIG. 9, through a phase shift coupling capacitor 662. The grounded base oscillator configuration preferably includes a transistor 664 having an emitter 666, a base 668 and a collector 670. A tank circuit or LC oscillator circuit is connected to the collector 670 of transistor 664 and comprises an inductor 672 and a variable or tunable capacitor 674. The emitter 666 is preferably coupled to the collector 670 in an oscillator feedback loop through a capacitor 676. The output of the modulator 44, which is an FM modulated audio output, is preferably provided through an output coupling capacitor 678 to the radio frequency generator and modulator 46. The balance of the oscillator 660 circuitry is conventional and will not be described in greater detail hereinafter.

The audio FM modulator 34 preferably operates in the following manner. The audio signal on the film 30 is preferably picked up by sound head 40 and is simplied in the conventional audio amplifier 42. This signal is coupled into the gate 646 of the field effect transistor 644 through coupling network 632. The provision of this audio signal on gate 646 causes a feedback current to be provided from the drain 648, through capacitor 652, back to the gate 646, causing a phase shift in this signal of a predetermined number of degrees depending on the frequency of the signal. This phase shifted signal is coupled to the oscillator feedback loop through capacitor 62, which couples this phase shifted signal to the oscillator feedback loop through capacitor 676 of the loop. This phase shifted signal causes a difference in phase angle between the emitter 666 and te collector 670 of transistor 664, and the collector 670 preferably tries to track the emitter 666 phase shift by phase shifting the feedback path of the LC oscillator 660 by detunning the tank circuit 674–672 off its center frequency by varying capacitor 674. By way of example, assuming the audio signal is a one kilohertz signal, and the oscillator 660 is normally tuned at the audio sub carrier frequency of 4.5 megahertz, when no video signal is present the tank circuit 674–672 and, thus, the oscillator 660, is at 4.5 megahertz. When the audio signal is provided to the audio amplifier, this causes a phase shift of a predetermined number of degrees and tries to pull the emitter 666 this predetermined number of degrees from its previous state. The collector 670 sees current flowing through transistor 664 and tries to lock up to the phase shifted signal present on the emitter 666 by shifting its phase to match the phase of the emitter 666. The collector 670 matches the frequency deviated signal present on the emitter 666 by detunning the tank circuit 674–672 by the amount of the incoming audio signal. When this audio signal is removed, the collector 670 retunes the tank circuit 674–672 back to its original center frequency of, in the example given, 4.5 megahertz because there is now no longer a difference in phase angle between the emitter 666 and the collector 670, the original phase reference to which the collector 670 retunes being the maximum impedance of the tank circuit 674–672. This tank circuit 674–672 detunes both sides of its center frequency so that at the output of the audio FM modulator 44 provided through coupling capacitor 678, an FM modulated output signal is provided wherein the audio sub carrier is FM modulated by the audio signal. Thus, in the example given, the 4.5 megahertz signal is varied plus and minus one kilohertz. Thus, by phase shifting the feed back path of the LC oscillator 660, undesirable amplitude modulation in the FM modulated output signal is minimized.

PHOSPHOR CORRECTION

Figure 10A:
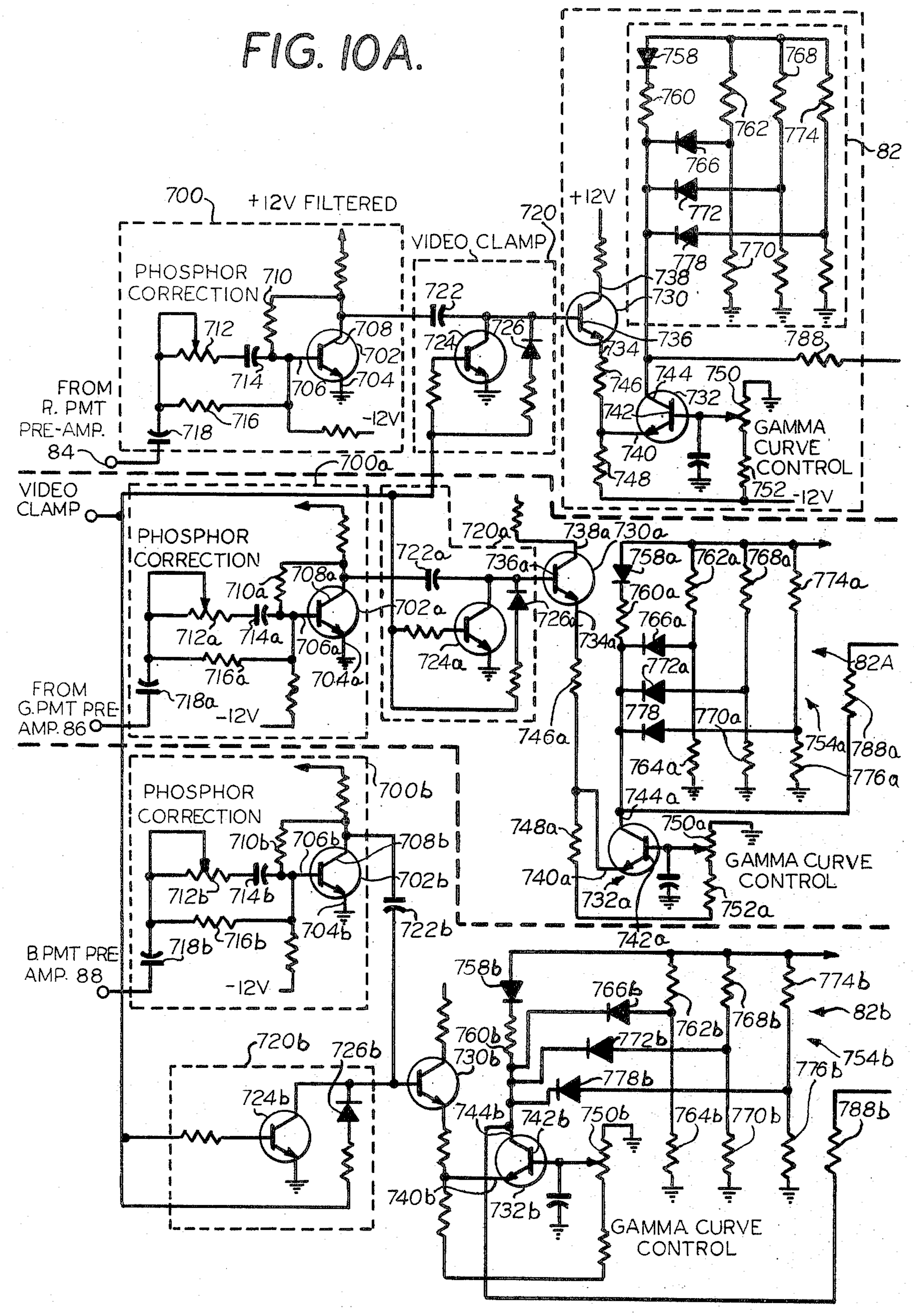
FIGS. 10*a* and 10*b* are a schematic diagrams of the chroma/video processor portion of the embodiment illustrated in FIG. 1 including the phosphor correction and gamma correction circuirty.
Figure 10B:
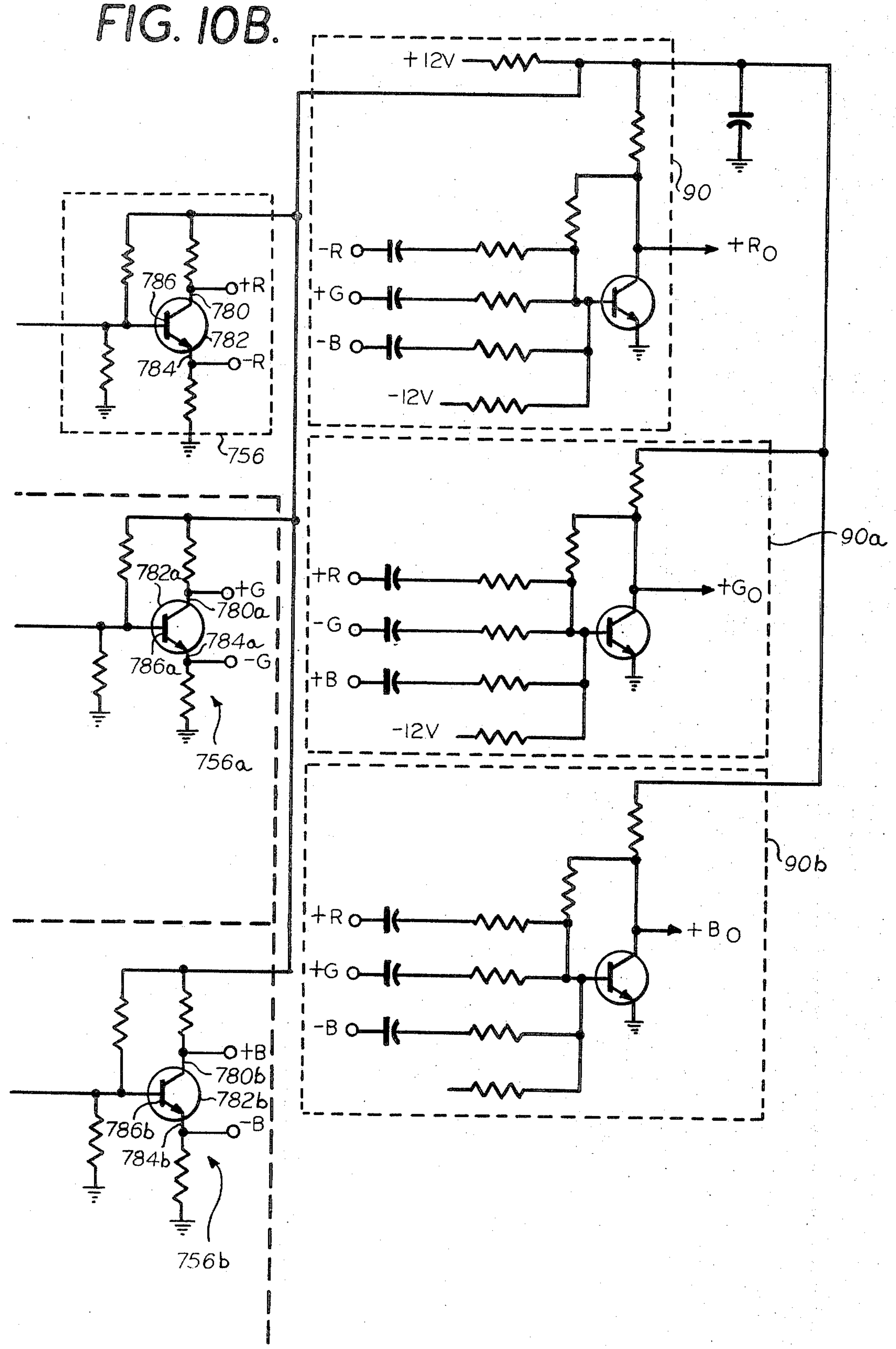

Referring now to FIG. 10, the schematic diagram of the preferred phosphor correction circuitry, video clamp circuitry and gamma correction circuitry utilized in the preferred embodiment of the flying spot scanning system 20 of the present invention is shown. The phosphor correction circuitry 700 will be described first with reference to the red channel, the phosphor correction circuitry portions **700*a* and 700*b* preferably functioning in essentially the same manner to accomplish phosphor correction for the green channel and for the blue channel, respectively, with only a difference in certain parameters to be described in greater detail hereinafter to compensate for the differences in phosphor decay time of the green phosphor versus the red phosphor and of the blue phosphor versus the red phosphor. For purposes of explanation identical functioning elements in the green channel and the blue channel are to be given the same reference numeral as in the description of the red channel followed by the letter "a" with respect to the green channel and the letter "b" with respect to the blue channel. The phosphor correction circuitry corrects for the decay associated with the respective phosphor, in the example being described the decay being associated with the red phosphor for phosphor correction circuit 700. The input signal to the phosphor correction circuit is provided from the associated photo multiplier tube preamplifier 84 for the red channel, 86 for the green channel and 88 for the blue channel. The wave form of this signal, which preferably be a square wave, resembles the output of a low pass filter due to the decay of the associated phosphor being slow. The input to the phosphor correction circuit, which is the direct output from the associated photo multiplier tube preamplifier 84, 86 and 88 depending on which color channel, is preferably a positive going signal. The phosphor correction circuit 700 preferably comprises a transistor 702, illustratively shown as an NPN transistor having an emitter 704 which is grounded, a base 706 and a collector 708. The collector 708 is tied to the base 706 through a feedback resistor 710. The input network to the base 706 preferably comprises a potentiometer 712 and a capacitor 714 which are connected in series and a base input resistor 716 which is connected in parallel with the RC network 712–714. This input network is coupled to the output of the associated preamplifier 84 through a coupling capacitor 718. Transistor 702 also has associated impedance which is illustrated. Preferably, transistor 702 is and amplifier which has a low frequency game which is determined by the ratio of the base input resistance 716 and the feed back resistance 710. By way of example, this gain could preferably be approximately 5 so that at a low frequency, for example 100 kilohertz or below, the amplifier 702 would have a straight gain of 5. As the frequency of the input signal, which is the output of the photo multiplier to preamplifier 84 in the red channel, goes up, the impedance of capacitor 714 goes down. Therefore, in effect, the higher the frequency, the lower the impedance of the input network comprising capacitor 714, resistor 712, and resistor 716. Since the gain of the amplifier 702 is a function of the input impedance and the feed back resistance, if we decrease the input impedance, we increase the gain of the amplifier 702. Therefore, as the frequency goes up as high frequency components of the video signal are approach, the gain of the amplifier 702 will also go up. In the case of the red channel, at a frequency of, by way of example, two to three megahertz, the impedance of capacitor 714 is preferably almost 0 and, accordingly, capacitor 714 effectively becomes a dead short. At this point, the gain of the amplifier 702 is then preferably a function of the setting on potentiometer 712 in parallel with the base input resistance 716 and the feed back resistance 710. Potentiometer 712 in parallel with base input resistance 716 provides the input impedance whose ratio with respect to the feed resistance 710 sets the gain for the amplifier 702. Therefore, the gain of amplifier 702 can be adjusted by adjusting potentiometer 712 for whatever amplitude is required while the size or value of capacitor 714 determines the point at which the gain levels off. The red phosphor is the slower of the three phosphors red, green and blue and, accordingly, is the phosphor which requires the most gain. Accordingly, capacitor 714 is much larger in value than capacitor 714*a* in the gree channel or 714*b* in the blue channel. This comparatively large capacitance enables adjustment down lower in the frequency band than in the other two channels. The blue phosphor correspondingly has the fastest response time in that only minimum phosphor correction is required in that channel. Accordingly, capacitor 714*b* is comparatively lower in value than capacitor 714*a* or 714. The green phosphor has a response time which falls somewhere in the middle between the red phosphor and the blue phosphor and, correspondingly, the value of capacitor 714*a* is chosen accordingly. Preferably, the value and the function of the balance of the components in the phosphor correction circuitry in both the green channel and the blue channel, 700*a* and 700*b*, respectively, are substantially identical with that previously described with reference to the red channel, except for the setting on the potentiometer 712*a* and 712*b*, respectively, which is preset as part of the calibration of the scanner. The calibration of the potentiometer 712, 712*a* and 712*b* is preferably accomplished by feeding in signals which should produce square waves at the output of the respective amplifier 702, 702*a* and 702*b*, and adjusting the setting of potentiometer 712, 712*a* and 712*b*, respectively until a square wave is actually obtained at the output of the respective amplifiers 702, 702*a* and 702*b*. The value of the capacitor 714, 714*a* and 714*b* is chosen to match the response time of the associated red, green, or blue phosphor. It should be noted that the associated amplifier configuration 702, 702*a* and 702*b* provides signal inversion, gain, phosphor correction and also provides a low impedance drive for the video clamp circuit 720 through decoupling capacitor 722 for the red channel, video clamp 720*a* and decoupling capacitor 722*a* for the green channel, and video clamp 720*b* and decoupling capacitor 722*b* for the blue channel, respectively, in a single stage amplifier. The respective video clamps 720, 720*a* and 720*b* for the red, green and blue channels respectively, are each preferably conventional comprising a transistor and diode configuration 724–726 which are resistively coupled together for the red channel, 724*a*–726*a* for the green channel and 724*b*–726*b* for the blue channel. The video clamps 720, 720*a* and 720*b*, respectively, set a reference level for the respective channels during the horizontal retrace time of the scanning cathode ray tube 22 and the television receiver 78 as there is no video output provided from the photo multiplier tube preamplifiers 84, 86 and 88, respectively at that time. Accordingly, there is 0 video data at that time and the video clamps 720, 720*a* and 720*b* establish the reference at respective outputs due to the voltage drop across the clamp transistor 724, 724*a* and 724*b*,** respectively. By way of example, this reference level may be approximately plus 0.2 volts.

GAMMA CORRECTION

Now with reference to FIG. 10, once again, the gamma correction portion 82, for the red channel, **82*a* for the green channel, and 82*b* for the blue channel, shall be described in greater detail. Each of the gamma correction circuits is preferably identical and only the gamma correction circuit 82 with respect to the red channel shall be described in greater detail for purposes of illustration, the function and value of the parameters in the gamma correction circuits 82***a* and 82*b* for the green and blue channels, respectively being preferably substantially identical and with like functioning components identified by the same reference numeral as utilized with respect to the description of the red channel followed by the letter for the green channel and the letter *b* for the blue channel. Preferably, the gamma correction network 82 for the red channel comprises an emitter coupled differential amplifier comprising transistors 730 and 732, with transistor 730 having an emitter 734, a base 736 and a collector 738 and with transistor 732 having an emitter 740, a base 742 and a collector 744. The configuration of the emitter coupled differential amplifier 730–732 is preferably substantially conventional and will not be described in greater detail hereinafter. Suffice it to say that the base 736 of transistor stage 730 is connected to the output of the video clamp 720 for receiving the input signal into the gamma correction circuit 82, this signal preferably being a signal which varies negatively from the video clamp reference level. The gamma correction circuit 82 is preferably a differential amplifier, as previously described, with a controlled gain which is due to the ratio of the resistors in the emitter circuits of the differential amplifier 730–732, the gain of the circuit being set by the ratio of resistors 746 and 748. By way of example, this gain may be approximately 9. The base bias on transistor stage 732 of the differential amplifier is preferably set by a resistive combination of a potentiometer 750 which, as will be described in greater detail hereinafter, acts as a gamma curve control potentiometer and resistance 752 connected in series therewith. A diode-resistive ladder network 754 is preferably connected in parallel to the collector 744 of transistor stage 732. The collector 744 of transistor stage 732 is also connected in parallel to a conventional phase splitter network 756. The diode-resistive ladder networks 754 preferably comprises a parallel combination comprising a diode 758 which is connected to the collector 744 through a resistor 760, a parallel combination of resistors 762 and 764 which are connected to the collector 744 through a diode 766, a parallel resistive combination of resistors 768 and 770 which are connected to the collector 744 through a diode 772, and a parallel resistance combination of resistors 774 and 776 which are connected to the collector 744 through another diode 778. The phase splitter network 756 is preferably a conventional transistor phase splitter which produces a pair of opposite and equal output signals, in this instance, the gamma corrected red video signal, a positive going red video signal being provided on the collector 780 of transistor 782 and a negative red video signal being provided on the emitter 784 of transistor 782. The base 786 of transistor 782 is connected to the collector 784 of transistor stage 732 through a resistor 788. The balance of the circuitry associated with the phase splitter 756 is preferably conventional and will not be described in greater detail hereinafter.

The functioning of the gamma correction network 82 is as follows. A known signal is provided to the input of the gamma correction circuit 82, which is base 736 of transistor stage 730 from the video clamp 720. The amplitude of this signal normally is preferably between the reference level of by way of example, 0.2 volts and, by way of example −1.8 volts, to provide a two volt peak-to-peak input signal at maximum value. The diode-resistive ladder network 754 connected to the collector 744 of transistor stage 732 is preferably bascially a square root circuit which takes the square root of the incoming signal. By way of example, the collector voltage at collector 744 is preferably set at plus 7 volts during the clamp time by adjusting the setting of the potentiometer 750, which value provides the gamma correction reference value. The signal present on conductor 744 would preferably vary in the negative direction from this reference value of plus 7 volts, diode 758 normally conducting. As this signal goes negative from this reference value plus 7 volts, a point is reached where diode 766 starts to conduct. At that point, the impedance of the collector circuit immediately switches from its initial value, which is determined by the impedance of resistor 760 plus the input network 788 to transistor 782, to this value in parallel with the parallel impedance of transistor 762 and 764. The collector impedance of transistor 732 is therefore suddenly dropped to this new value whereby for a given change *n* in collector 744 current a smaller change in collector 744 voltage will be provided. As the voltage on collector 744 continues to go down or decrease, the point will be reached where diode 772 will begin to conduct. At this point, the collector impedance once again is changed to a new value comprising the parallel impedance of resistors 768 and 780 with the previously computed impedance so that once again, the collector impedance has dropped and for a given change in collector current, a still smaller change in collector voltage will occur. Similarly, as the voltage on the collector 744 continues to drop further, the point will be reached when diode 778 will start to conduct. At this point, the collector impedance will once again change to a combination of the parallel impedance of resistors 774 and 776 in parallel with the previously computed impedance when diode 772 began to conduct. Once again, therefore, the collector impedance has dropped and for a given change in collecto current, a still smaller change in collector voltage will result. Accordingly, a linear video signal in the form of a current wave form is placed on the emitter 740 of transistor stage 732 and the square root of this signal is provided on the collector 744 in the form of a voltage wave form. Therefore, since a current wave form is being fed into the transistor stage 732, the voltage present on the collector 744 is strictly a function of the impedance of the collector circuit. Accordingly, since a known current is present on the collector 744 of transistor stage 732, if the circuit 82 gets hot with a change in voltage drop occurs across the diodes 766, 772 and 778, a corresponding change in voltage drop will also be provided across diode 758 since it is in series with resistor 760 which is the main collector resistor. Accordingly, if a change in voltage drop due to, for example, temperature conditions, results on one of the diodes on this network, a change in all will result and this condition will balance out so that a change in output level may result but no change in wave form will result. Furthermore, since a current other than a voltage is being fed to the emitter 740 of transistor stage 732, the drop will be constant in all cases.

It should be noted that by changing the bias of the base 742 of transistor stage 732 by varying the setting of potentiometer 750, the current through transistor stage 732 may be changed so that the circuit 82 can slide up and down the gamma correction curve. For example, if the current through the transistor stage 732 is decreased by changing a setting on potentiometer 750, the collector 744 reference voltage will increase and the wave form can be distorted to increase the black emphasis. Similarly, if the current through transistor stage 732 is increased, the collector 744 reference voltage will decrease and the black emphasis will be decreased. Accordingly, by varying the bias on the base 742 of transistor stage 732 via potentiometer 750, the amount of gamma correction obtained can actually be changed so as to enable sliding up and down the gamma correction curve merely by varying the base current to transistor stage 732.

Referring once again to the emitter couple differential amplifier configuration 730–732 of the gamma correction network 82, transistor stage 730 preferably has a base-emitter drop which changes with temperature, the same base-emitter drop preferably occuring at transistor stage 732 with temperature. ACcordingly, since these drops both vary in the same direction, they tend to cancel each other out and this tends to make the gamma correction circuit 82 more stable with temperature. In addition, the differential amplifier configuration 730–732 provides a high impedance load for the video clamp 720, which high impedance load is most desirable so as to control the charge and discharge of the decoupling capacitor 722 so as to enable the signal present on the base 736 of transistor 730 to easily return to its reference level during retrace and blanking.

Chroma Clamp

Figure 11:
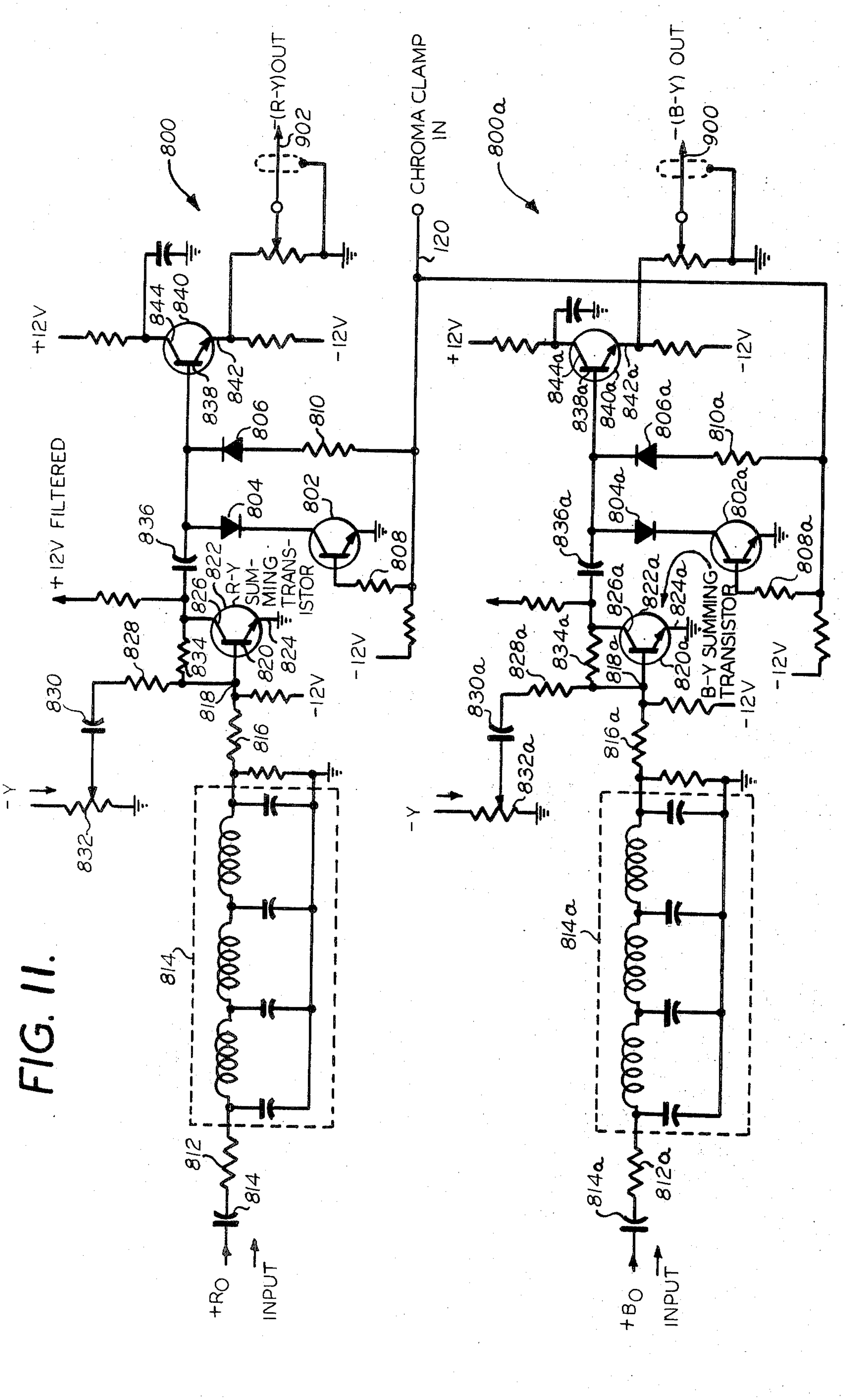
FIG. 11 is a schematic diagram of the chroma clamp portion of the chroma/video processor portion of the embodiment illustrated in FIG. 1 illustrating the chroma clamp for the R—Y and B—Y signals.

The phosphor corrected and gamma corrected video outputs of the red, green and blue channels which are provided through the associated phase splitter network **756, 756*a* and 756*b*, are respectively fed to conventional color masking and mixture matricies 90, 90*a* and 90*b* to produce the processed color video signals $R_o$, $G_o$, and $B_o$ in conventional fashion. These circuits are illustrated in FIG. 10 and are conventional and will not be described in greater detail hereinafter. Referring now to FIG. 11, a schematic diagram of the preferred chroma clamp 800 and 800*a* is shown. The luminance signal minus Y and plus Y are produced in conventional fashion from the $R_o$, $G_o$ and $B_o$ signals in conventional fashion by conventional luminance summing circuit and will not be described in greater detail hereinafter. With respect to the chroma clamps 800 and 800*a*, these clamps are preferably functionally identical, clamp 800 being provided for the minus (R–Y) signal and clamp 800*a* being provided for the minus (B–Y) signals. For purposes of explanation, since these circuits are functionally identical, only the chroma clamp for the munus (R–Y) signal will be described in greater detail with identical reference numerals being utilized for similarly functioning elements in clamp 800*a*** folosed by the letter *a*.

The chroma clamp 800 configuration comprises a transistor stage 802, a pair of diodes 804 and 806, and associated resistors 808 and 810 connected in a feed back path. However, for purposes of explanation, the balance of the associated circuitry will be referred to as forming part of the chroma clamp configuration although the actual chroma clamp is only the above mentioned elements. The input to the R–Y chroma clamp 800 is the $R_o$ output signal of matrixes 90 and is provided via an RC network 812–814 to a conventional LC filter network 814 to narrow the bandwidth of the incoming signal to a predetermined band width such as, by way of example, 500 kilohertz. This filtered signal is fed through a resistor 816 to summing point 818 and therefrom to the base 820 of R–Y summing transistor 822, this transistor 822 also having a grounded emitter 824 and a collector 826. Summing point 818 is also connected via resistor 828, coupling capacitor 830 and potentiometer 832 to the minus Y luminance output of the conventional luminance summing circuit (not shown). The base 820 of transistor 822 is preferably a current node so that the plus $R_o$ signal and the minus Y signals are added at the base 820 of transistor 822 at summing point 818. Transistor 822 amplifies this sum. A feed back resistor 834 is connected between the collector 826 and the base 820 of transistor 822 and controls the gain of transistor 822. The signal present at the collector 826 of transistor 822 is the inverted sum of plus $R_0$ and munus Y or minus ($R_o$ –Y). This signal is fed through the chroma clamp 802–804–806–808–810 via coupling capacitor 836 and, therefrom, to the base 838 of output transistor 840 which also has an emitter 842 and a collector 844. The functioning of the chroma clamp 800 is preferably substantially identical with the functioning of the previously described video clamp in that a pulse is provided path 120 during the horizontal retrace time, which pulse is preferably positive going, by way of example, 0 to 0.5 volts, in amplitude. This pulse is provided through resistor 808 to the base of transistor 802 and causes transistor 802 to turn on and saturate. This causes the collector voltage of transistor 802 to drop to a level, by way of example, of +o.2 volts. This output signal on the collector of transistor 802 flows through transistor 802, to diode 804 to diode 806, through resistor 810, and through resistor 808 back to the input of transistor 802. As this current flows past capacitor 836, this capacitor either charges or discharges in an attempt to return to its reference level. This clamps base 838 of transistor 840 to a reference level of, in the example given, plus 0.8 volts. Diode 804 enables the output signal to be as near 0 volts reference as possible. In the configuration illustrated by way of example, transistor 840 has a base emitter drop of, by way of example, plus 0.6 volts, transistor 840 being connected in an emitter follower configuration to provide a high impedance on the output of the chroma clamp, transistor 840 being an impedance matching transistor. Diode 804 substantially compensates for the base-emitter drop of transistor 840 although there is still some voltage present and ther eference level, in the example given, is +0.2 volts at the output of transistor 840. If desired, this value may be brought to the desired 0 volts reference level in a conventional fashion, such as by connecting a saturated transistor in series with the emitter 842 of transistor 840 so as to provide the 0 volt reference level. In functioning as a low impedance source for the chroma clamp, the gain of transistor 822 will change in an attempt to maintain the collector 826 voltage constant.

CHROMA MODULATOR

Figure 12:
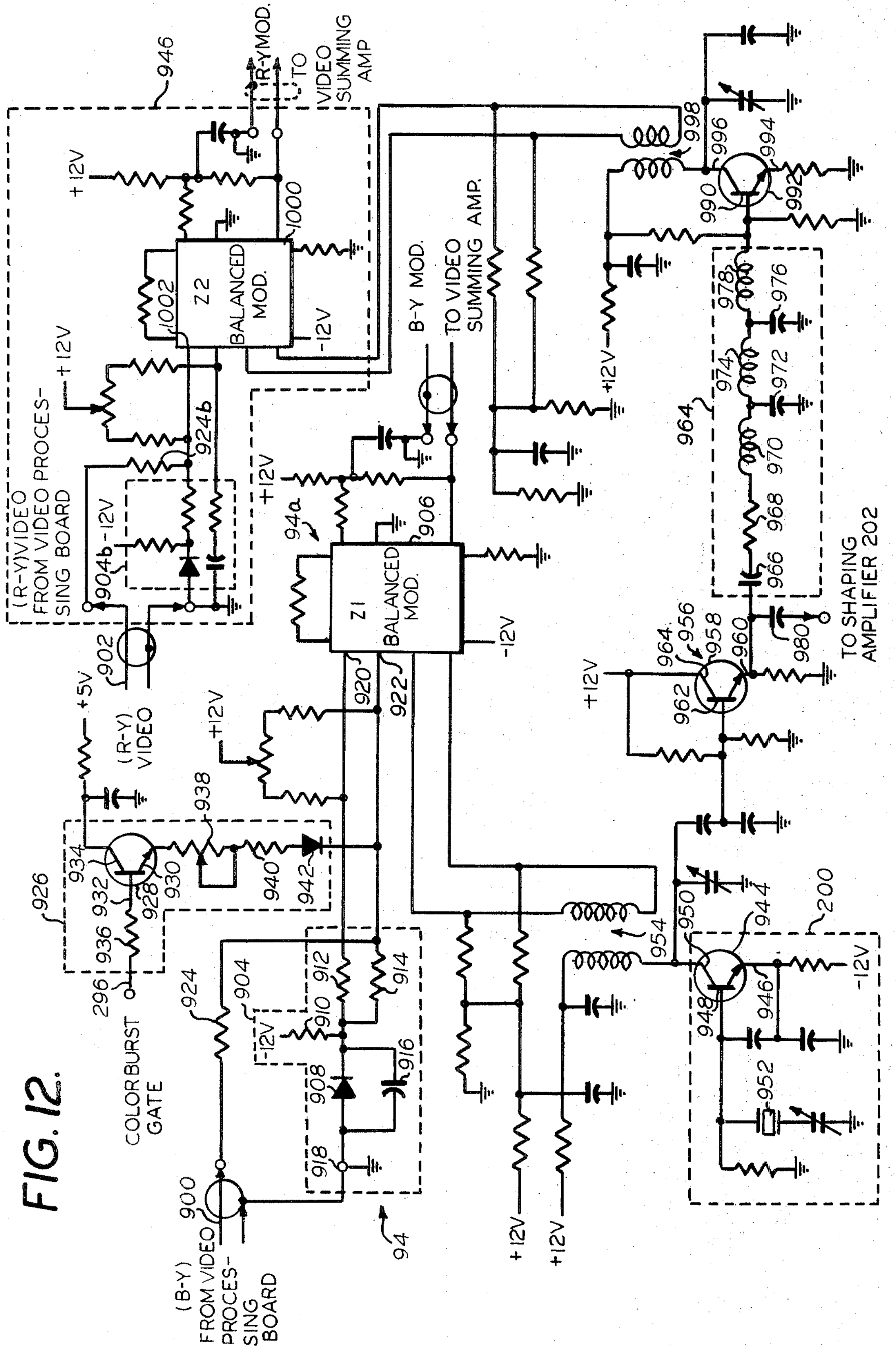
FIG. 12 is a schematic diagram of the chroma modulator portion of the embodiment illustrated in FIG. 1.

Referring now to FIG. 12, the chroma modulator configuration 94, which modulates the (B—Y) and the (R—Y) video or chroma signal output of the chroma clamp 800*a* and 800, respectively, provides via path 900 and 902, respectively, shall be described in greater detail. Initially describing the chroma modulator portion 94*a*, which is the chroma modulator for the (B—Y) signal, the chroma modulator 94*a* includes a dc reference level network 904, which is a conventional network which enables the development of the (B—Y) chroma signal between the input line 900 and the reference on the chroma clamp in which the input line, which is illustratively shown as a coaxial cable, is connected so as to keep noise off the input to a balanced modulator 906 which, in conventional fashion, phase and amplitude modulates the (B—Y) chroma signal, as will be described in greater detail hereinafter. As shown and preferred, balanced modulator 906 is a conventional balanced modulator configuration such as is commercially available from Motorola under a designation MC 1496 L or MC 1596 balanced modulator chip, equivalent chips being manufactured by other companies such as Texas Instruments or Signetics, by way of example. The circuitry associated with the balanced modulator chip 906 is conventional and will not be described in greater detail hereinafter. The conventional dc reference level network 904 preferably includes a diode 908, a resistor network 910–912–914 and a capacitor 916 which function to set the proper dc reference level for the balanced modulator chip 906. It should be noted that the reference or ground for this circuit is being brought in through the shield of a coaxial cable so that the noise on the video signal can be controlled. This reference being brought in through the shield of the coaxial cable is preferably tied to point 918 which becomes the reference for the circuit, diode 908 functioning in conventional fashion to set a dc reference level on input terminals 920 and 922 of balanced modulator chip 906 which is tied back to the chroma clamp which generated the signal. The (B—Y) chroma signal input provided via path 900 from the associated chroma clamp 800*a* is fed to the input terminal 922 of the balanced modulator chip 906 through an input resistor 924.

The color burst gate signal provided via path 296 from the color burst single shot network 294 is provided through a control network 926, in parallel with the (B—Y) chroma signal input to input terminal 922 of the balanced modulator chip 906. Control network 926 preferably includes a conventional emitter follower 928 which provides power amplification and isolation for the signal, transistor 928 having an emitter 930 and base 932 and a collector 934, with the base 932 being connected to the color burst gating signal output of color burst signal shot 294 through a resistor 936. The emitter 930 of transistor 928 is connect in parallel to input terminal 922 of balanced modulator chip 906 through a potentiometer 938, resistor 940 and diode 942. The amplitude of the square wave color burst gating signal provided to input terminal 922 is controlled by a potentiometer 938, the color burst gating signal preferably being a positive going square wave. This positive going pulse preferably turns balanced modulator chip 906 "hard-on" for a controlled period of time which is the duration of the gating signal, such as, by way of example, eight to 12 cycles. This burst of "hard-on" signal is the color burst reference pulse which the conventional color television receiver sees as the chroma burst. The output of the (B—Y) modulator chip 906, which is a phase and amplitude modulated (B—Y) chroma signal and a separate color burst reference signal, is fed to the video summing network 92.

The color sub carrier for the modulator signal, which is preferably a conventional 3.579 megacycle color sub carrier, is preferably generated in conventional fashion by a crystal controlled reference oscillator 200 comprising a transistor 144 having an emitter 946 a base 948 and a collector 950, with a 3.579 megacycle crystal 952 being connected to the base 948 in a conventional crystal control oscillator network 200 which will not be described in greater detail hereinafter. The collector 950 output of the oscillator transistor 944 is preferably connected in parallel to the input to the balanced modulator chip 906 providing the color sub carrier thereto through a conventional transformer 954. The collector 950 output of transistor 934 is also connected in parallel, preferably, to a conventional emitter follower configuration 956 which provides isolation with a high input impedance and low output impedance. The emitter follower configuration 956 preferably comprises an emitter follower transistor 958 having an emitter 960, a base 962 and a collector 964. The balance of the emitter follower configuration 956 is conventional and will not be described in greater detail hereinafter. The emitter 960 of transistor 958 is preferably connected in parallel to a conventional 90° phase shifter network 964 comprising capacitor 966, resistor 968, inductor 970, capacitor 972, inductor 974, variable capacitor 976 and inductor 978 which function in conventional fashion to provide a 90° phase shift for the color sub carrier reference signal output of oscillator 200 which signal is thus shifted 90° in phase in relation to the color sub carrier signal provided to the (B—Y) balanced modulator chip 906. In addition, the emitter 960 of transistor 958 is connected in parallel via coupling capacitor 980 to shaping amplifier 202 of the digital frequency synchronizing generator 104 to provide the basic timing reference signal therefor. The output of the 90° phase shifter network 964, which network is driven by the emitter follower 956, is connected to the base 990 of a conventional transistor amplifier 992, having an emitter 994 and a collector 996 in addition to base 990. The collector 996 output of transistor amplifier 992 which is the 90° phase shifted color sub carrier reference signal is preferably connected through a conventional transformer 998 to provide the color sub carrier input to the balanced modulator chip 1000 of the (R—Y) chroma modulator portion 94*b* of chroma modulator 94.

Chroma modulator portion 94*b* for the (R—Y) chroma or video signal is preferably substantially identical in function with that previously described with reference to the (B—Y) modulator portion 94*a*, except that balanced modulator chip 1000 does not receive color burst gating signal as an input and does not, therefore, generate a separate color burst reference signa,, and, accordingly, will not be described in greater detail hereinafter. Suffice it to say that the balanced modulator chip 1000 is preferably substantially identical in operation and configuration with balanced modulator chip 906 and is also preferably the balanced modulator chip of the type commercially available by Motorola under designation MC 1496 L or MC 1596 L. The signal from the (R—Y) chroma clamp 800 via path 902 and input resistor **924*b* is preferably connected to the input terminal 1002 of modulator chip 1000. The dc reference level for modulator chip 1000 is also provided in conventional fashion by a conventional dc reference level network 904*b* which is substantially identical to network 904. The balance of the operation and configuration of the (R—Y) chroma modulator portion 94*b* is substantially identical with that previously described with reference to modulator portion 94*a* and will not be described in greater detail hereinafter, as mentioned above. The output of chroma modulator portion 94*b* is a phase and amplitude modulated (R—Y) chroma signal on the sub carrier which is referred to the video summing network 92 where it is summed with the sunchronizing signals, blanking signals, etc and, ultimately, with the audio signals, to provide the composite television signal which is transmitted to the television receiver 48 in conventional fashion. Preferably, the transmitted color video signal portions are the color compatable signals (R—Y) and (B—Y) are opposed to the I and Q signals. It should be noted that the emitter follower configuration 956 also functions as an impedance matching device which takes the signal out of the reference oscillator 200 and couples it to the phase shifter network 964 as well as to the digital synchronizing generator 104.**

ALTERNATIVE EMBODIMENTS

Figure 4:
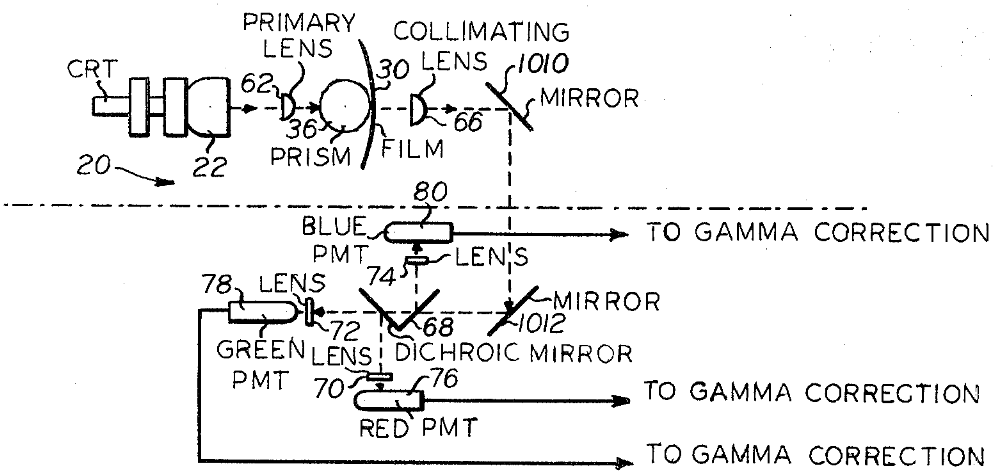
FIG. 4 is a diagrammatic illustration similar to FIG. 2 of an alternative embodiment of the preferred optical arrangement illustrated in FIG. 2.
Figure 5:
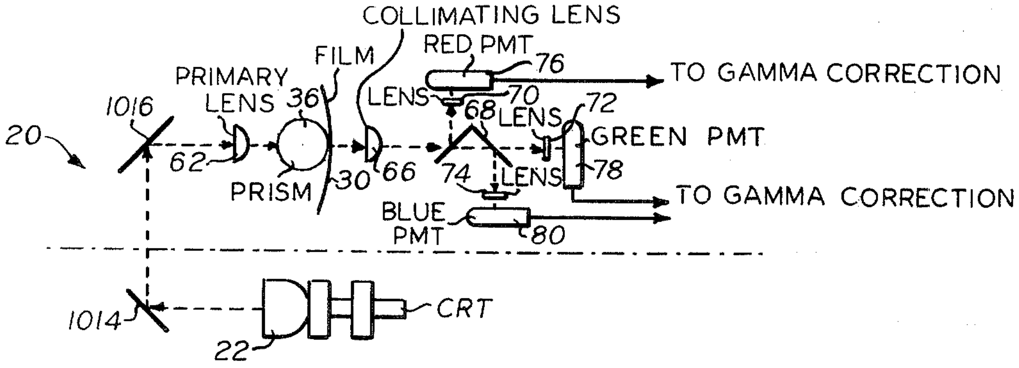
FIG. 5 is a diagrammatic illustration similar to FIG. 2 of another alternative embodiment of the preferred optical arrangement illustrated in FIG. 2.

Referring now to FIGS. 4 and 5, alternative optical arrangements for use with the flying spot scanning system 20 of the present invention are shown. Referring initially to FIG. 4, a folded optics arrangement is illustrated wherein the light after passing through collimating lens 66 is folded 180° by means of mirrors 1010 and 1012, before passing to the dichroic mirror arrangement 68 where the balance of the optical arrangement is identical with that previously described with reference to FIG. 2. The processing of the signals in the embodiment of FIG. 4, and the operation of the device, except for the particular folded optic path, is preferably identical with that previously described with reference to the embodiment illustrated in FIGS. 1 and 2. With respect to FIG. 5 a difference folded optics arrangement is illustrated wherein the light directly emitted by the flying spot cathode ray tube 22 is folded 180° in conventional fashion by mirrors 1014 and 1016 before being passed through primary lens 62. As in the previous arrangement, the balance of the optical arrangement and the processing and functioning of the flying spot scanning system 20 is preferably identical with that previously described with reference to FIGS. 1 and 2, with the exception of this folded optics arrangement.

It is to be understood that the above described embodiments of the invention are merely illustrative of the principles there of and that numerous modifications and embodiments of the invention may be derived within the spirit and scope thereof.

As used throughout the specification and claims, the term "film" is meant to include any data storage media capable of being used with a flying spot scanner to provide a video signal therefrom, and the term synchronizing signals, generally, is meant to include all the control signals provided from generator 104.

What is claimed is:

1. A flying spot scanning system capable of scanning a continuously moving film containing color information thereon to provide a composite color video signal therefrom which is displayable on a color television means, said system comprising a cathode ray tube flying spot light source; means for continuously moving a portion of said film past said light source for enabling said film portion to be scanned by said light source as said film portion moves past said light source; means interposed between said moving film and said flying spot light source for providing a flying spot lap-dissolve scan of said continuously moving film portion, detection means in optical alignment with said lap-dissolve scanned film portion and said lap-dissolve scan providing means for detecting said scan and providing a video signal therefrom, said detection means comprising color separation means for optically separating said detected scan into red, blue and green components and photomultiplier means for detecting each of these components to provide electrical signals representative of separate red, blue and green components of said flying spot scan; processing means operatively connected to said photomultiplier means for processing said detected red, blue and green scan component representative signals for providing said composite color video signal therefrom, said processing means comprising color burst frequency signal, penetration means for providing a color burst component for said composite color video signal and means for providing an (R—Y) and (B—Y) color video information component for said composite color video signal from said signals representative of said detected red, blue and green components of said flying spot scan; and digital synchronizing signal generator means operatively connected to said flying spot light source and said processing means for controlling the operation thereof, said synchronizing signal generator comprising means responsive to said color burst frequency signal for digitally providing from said color burst signal a plurality of digital synchronizing signals of differing parameters from said color burst signal, said color burst signal being a basic timing reference signal for said synchronizing signal generator, said generated plurality of digital synchronizing signals comprising synchronizing signals for controlling all of the synchronization of the cathrode ray tube flying spot light source as well as all the synchronization of the color television means, said color television means synchronizing signals being provided to said video processing means, said video processing means combining said color burst signal, said color video information component signals and said color television means synchronizing signals to comprise said composite color video signal.

2. A flying spot scanning system in accordance with claim 1 wherein said synchronizing generator comprises means for digitizing said color burst signal and a digital frequency divider chain for operating on said digitized basic timing reference color burst signal to provide a composite blanking synchronizing signal and a composite sync synchronizing signal as said color television synchronization signals.

3. A flying spot scanning system in accordance with claim 2 wherein said divider chain further operates on said digitized basic timing reference color burst signal to provide a chroma clamp and a video clamp synchronizing signal to said processor means for setting signal reference levels in said processing means for the processing of said representative signals.

4. A flying spot scanning system in accordance with claim 2 wherein said divider chain further operates on said digitized basic timing reference color burst signal to provide a vertical sweep drive and a horizontal sweep drive synchronizing signal as said cathode ray tube flying spot light source synchronization signals for vertically and horizontally synchronizing the scan of said flying spot light source.

5. A flying spot scanning system in accordance with claim 2 wherein said divider chain further operates on said digitized basic timing reference color burst signal to provide a controlled duration for said color burst signal component of said composite color video signal.

6. A flying spot scanning system in accordance with claim 1 wherein said system further includes data terminal means for externally controlling the information to be displayed on said color television means, said data terminal means comprising a computer means and a computer interface means operatively connected between said computer means and at least said processing means for enabling interactions therebetween whereby said displayable color television information is externally controlled; and said synchronization generator comprises means for digitizing said color burst signal and a digital frequency divider chain for operating on said digitized basic timing reference color burst signal to provide a horizontal sync synchronizing signal and a vertical sync synchronizing signal to said data terminal means for synchronizing said data terminal means with said color television means and said cathode ray tube flying spot light source means, said generated plurality of synchronizing signals further comprising said horizontal and vertical sync external control data terminal means synchronizing means for further controlling said data terminal means synchronization.

7. A flying spot scanning system in accordance with claim 1 wherein said lap-dissolve scanning means comprises a rotatable multifacted prism means, three facets of said prism covering three frames of said film being scanned in lap-dissolve light paths as said prism rotates, whereby a first facet fades into the film portion being scanned, a second facet scans said film portion, and a third facet fades out from said film portion, the light output to said photomultiplier tube means being the sum of the lap-dissolve light paths.

8. A flying spot scanning system in accordance with claim 7 wherein said lap-dissolve scanning means further comprises a primary lens interposed beween said prism and said cathode ray tube flying spot light source for forcusing said light source along an optical axis on said prism, said prism rotating about a normal to said optical axis, said prism means comprising a solid prism having a predetermined number of facets which number balances the factors of minimal distoration through said prism, light output from said prism and the size of the back focal length of said primary lens.

9. A flying spot scanning system in accordance with claim 8 wherein said prism comprises 18 facets.

10. A flying spot scanning system in accordance with claim 8 wherein said prism has a predetermined diameter D for said predetermined number of facets defined by the relationship;

average diameter $D' = D_{max} + D_{min};/Z$ corner to corner diameter for said prism $= D_{max} = [Y_N\theta(N_d^2 - \sin^2\theta)^{1/2}]/\theta_N\sin\theta[(N_d^2 - \sin^2\theta)^{1/2} - \cos\theta]$ and center to center diameter for said prism $= D_{min} = Y_N N_d/[\theta_N(N_d - 1)]$ where $\theta_N = \theta_{max}$, $\theta$ = angle formed between the prism face and said film, $Y_N$ = half pitch of prism = half film frame height, $N_d$ = refractive index for sodium D line and $V_d$ = Abbey constant $-(N_d - 1)/(N_F - N_C)$ where $F$ line = blue and $C$ line = red.

11. A flying spot scanning system in accordance with claim 10 wherein said film is super 8 movie film and said prism is Schott BK7 type glass and has a refractive index of substantially 1.517 for the sodium D line with a corresponding Abbey constant of substantially 64.2, and said prism has an interior angle between adjacent facets of substantially 160° ± ½′.

12. A flying spot scanning system in accordance with claim 11 wherein said prism facets each have a length of substantially 0.246 inches, said prism diameter is substantially 1.396 inches and said prism has a width of substantially 0.5 inches.

13. A flying spot scanning system in accordance with claim 7 wherein said system further comprises idler sprocket means geared to said prism means for rotation therewith, said film means having sprocket holes therein with said sprocket means engaging said film sprocket holes for rotation with said moving film, said prism rotating with said sprocket means for synchronizing the feed of said film; the sprocket means being driven by said film, and said prism being driven by said sprocket means.

14. A flying spot scanning system in accordance with claim 13 wherein said film moving means comprises capstan driven means.

15. A flying spot scanning system in accordance with claim 1 wherein said color separation means comprises dichroic means and each of said photomultiplier means including focusing lens means optically interposed between said photomultiplier means and said dichroic means.

16. A flying spot scanning system in accordance with claim 15 wherein said detection means further comprises collimating lens means optically interposed between said film portion being scanned and said dichroic means in optical alignment therewith.

17. A flying spot scanning system in accordance with claim 1 wherein said processing means comprises a video clamping means and phosphor correction means operatively connected between each of said photomultiplier means outputs and said video clamping means for correcting for the phosphor decay time associated with the red, green and blue phosphors, respectively, said phosphor correction means comprising a single stage transistor amplifier means capable of providing signal inversion and gain and phosphor correction for said photomultiplier means representative signals, and a low impedance drive for said video clamping means.

18. A flying spot scanning system in accordance with claim 1 wherein said processing means comprises gamma correction means operatively connected to each of said photomultiplier means outputs for gamma correcting said representative signals, said gamma correction means comprising an emitter coupled transistor differential amplifier means having an output stage having a base, an emitter and a collector, a diode-resistor ladder network means operatively connected to said output stage collector, said ladder network comprising a plurality of parallel diode-resistor branches, each of said diode branches having a different cut-in voltage, said network being substantially a square root circuit, said representative signals being provided to said output stage collector through said differential amplifier means, said representative signal being provided as a linear video signal in the form of a current waveform on said output stage emitter and substantially the square root of said linear video signal being provided on said output stage collector as a voltage waveform, each of said diodes cutting in at a different value of said collector voltage, whereby the collector associated impedance drops as more parallel diode-resistor branches are cut in providing a decreasing change in collector current for a given change in collector voltage with decreasing collector impedance.

19. A flying spot scanning system in accordance with claim 18 wherein said gamma correction means further comprises a potentiometer means connected to said output stage base for clamping the base bias to vary the operating point on the gamma correction curve.

20. A flying spot scanning system in accordance with claim 1 wherein said film includes a audio information and said system further includes separate audio processing means for separately detecting and processing said audio information, and combining means for combining said processed audio information and processed video information into said composite signal, said audio processing means comprising an audio FM modulator means, said audio modulator means comprising a field effect transistor phase shifting means and an audio subcarrier transistor oscillator means, said field effect transistor means receiving said detected audio signal, said oscillator means having a base, an emitter and a collector with the field effect transistor phase shifted output being coupled to the collector of said oscillator transistor, a tunable LC tank circuit having a center frequency of said audio subcarrier frequency being connected in parallel to said collector, the FM modulated audio output being provided from said emitter, said emitter being coupled to said collector in a feedback loop with said tank circuit, said phase shifted input to said tank circuit causing retuning of said tank circuit to provide said FM modulated audio output, said collector tracking said emitter phase shift to provide said FM modulated audio output.

21. A flying spot scanning system in accordance with claim 1 wherein said processing means comprises chroma modulator means for modulating said (R—Y) and (B—Y) signals and chroma clamping means for setting a dc reference level for said chroma modulator means.

* * * * *